US007962590B1

(12) United States Patent
Or et al.

(10) Patent No.: US 7,962,590 B1
(45) Date of Patent: *Jun. 14, 2011

(54) AUTOMATED DISCOVERY OF A MULTITIER COMPUTE INFRASTRUCTURE

(75) Inventors: Yan Or, San Ramon, CA (US); Johan Casier, San Jose, CA (US); Krishna Garimella, San Jose, CA (US); Umesh Bellur, Sunnyvale, CA (US); John Koper, San Francisco, CA (US); Shashank Joshi, San Jose, CA (US); Girard Chandler, Los Altos, CA (US); Vinu Sundaresan, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1812 days.

This patent is subject to a terminal disclaimer.

(21) Appl. No.: 10/391,124

(22) Filed: Mar. 17, 2003

Related U.S. Application Data

(62) Division of application No. 10/365,185, filed on Feb. 11, 2003, now Pat. No. 7,337,184.

(60) Provisional application No. 60/396,666, filed on Jul. 17, 2002.

(51) Int. Cl.
*G06F 15/173* (2006.01)
(52) U.S. Cl. .................................. 709/223; 709/226
(58) Field of Classification Search .................. 709/223, 709/224, 225; 707/105
See application file for complete search history.

(56) References Cited

U.S. PATENT DOCUMENTS

| 4,558,413 | A | 12/1985 | Schmidt et al. |
| 4,951,192 | A | 8/1990 | Chase, Jr. et al. |
| 5,724,556 | A | 3/1998 | Souder et al. |
| 5,867,714 | A | 2/1999 | Todd et al. |
| 5,889,520 | A * | 3/1999 | Glaser ........................... 715/853 |
| 5,930,795 | A | 7/1999 | Chen et al. |
| 5,959,871 | A | 9/1999 | Pierzchala et al. |
| 6,085,198 | A | 7/2000 | Skinner et al. |
| 6,151,582 | A | 11/2000 | Huang et al. |
| 6,182,136 | B1 * | 1/2001 | Ramanathan et al. ........ 709/224 |
| 6,202,207 | B1 | 3/2001 | Donohue |
| 6,405,251 | B1 | 6/2002 | Bullard et al. |
| 6,411,956 | B1 | 6/2002 | Ng |

(Continued)

FOREIGN PATENT DOCUMENTS

WO 0239257 5/2002

OTHER PUBLICATIONS

PCT International Search Report, International Application No. PCT/US03/21696, Oct. 6, 2003, 3 pages.

(Continued)

*Primary Examiner* — John Follansbee
*Assistant Examiner* — Dhairya A Patel
(74) *Attorney, Agent, or Firm* — David W. Victor; Konrad Raynes and Victor LLP

(57) ABSTRACT

A topology of a multitier compute infrastructure is automatically discovered. Discovery can be roughly divided into two phases. In one phase, components and physical relationships are discovered. In the other phase, non-physical relationships between the components are deduced. The second phase typically is based in part on information obtained in the first phase. In one application, the components and relationships that are discovered/deduced are used to build a map of the multitier compute infrastructure.

27 Claims, 24 Drawing Sheets

U.S. PATENT DOCUMENTS

| | | |
|---|---|---|
| 6,418,554 B1 | 7/2002 | Delo et al. |
| 6,425,126 B1 | 7/2002 | Branson et al. |
| 6,539,425 B1 | 3/2003 | Stevens et al. |
| 6,574,635 B2 | 6/2003 | Stauber et al. |
| 6,597,956 B1 * | 7/2003 | Aziz et al. .................. 700/3 |
| 6,606,744 B1 | 8/2003 | Mikurak |
| 6,665,867 B1 | 12/2003 | Ims et al. |
| 6,675,228 B1 | 1/2004 | Bahrs et al. |
| 6,718,535 B1 | 4/2004 | Underwood |
| 6,754,896 B2 | 6/2004 | Mishra et al. |
| 6,760,748 B1 | 7/2004 | Hakim |
| 6,779,016 B1 | 8/2004 | Aziz et al. |
| 6,779,177 B1 | 8/2004 | Bahrs et al. |
| 6,782,508 B1 | 8/2004 | Bahrs et al. |
| 6,892,382 B1 | 5/2005 | Hapner et al. |
| 6,931,546 B1 | 8/2005 | Kouznetsov et al. |
| 6,954,930 B2 | 10/2005 | Drake et al. |
| 6,957,186 B1 | 10/2005 | Guheen et al. |
| 6,986,135 B2 | 1/2006 | Leathers et al. |
| 7,072,807 B2 * | 7/2006 | Brown et al. .................. 703/1 |
| 7,143,420 B2 * | 11/2006 | Radhakrishnan ............ 719/328 |
| 7,181,731 B2 | 2/2007 | Pace et al. |
| 7,568,019 B1 * | 7/2009 | Bhargava et al. ............ 709/223 |
| 2001/0047251 A1 | 11/2001 | Kemp |
| 2002/0069163 A1 | 6/2002 | Gilbert |
| 2002/0092004 A1 | 7/2002 | Lee et al. |
| 2002/0174059 A1 | 11/2002 | Guo |
| 2003/0018963 A1 | 1/2003 | Ashworth et al. |
| 2004/0025157 A1 | 2/2004 | Blight et al. |
| 2004/0078569 A1 | 4/2004 | Hotti |
| 2004/0098154 A1 | 5/2004 | McCarthy |
| 2008/0082978 A1 | 4/2008 | Or et al. |

OTHER PUBLICATIONS

Oppenheimer, David. The importance of understanding distributed system configuration. System Administrators are Users, Too: Designing Workspaces for Managing Internet-Scale Systems CHI 2003 (Conference on Human Factors in Computing Systems) workshop, Apr. 2003. 3 pages.

U.S. Patent Application entitled "Topology Mapping of a Multitier Compute Infrastructure", U.S. Appl. No. 10/365,185, filed Feb. 11, 2003, by inventors Y. Or, J. Casier, K. Garimella, U. Bellur, J. Koper, S. Joshi, G. Chandler and V. Sundaresan.

U.S. Patent Application entitled "Business Service for a Multitier Compute Infrastructure", U.S. Appl. No. 10/366,817, filed Feb. 13, 2003, by inventors S. Joshi, U. Bellur, Y. Or, J. Koper and V. Sundaresan.

U.S. Patent Application entitled "Service Descriptor for a Multitier Compute Infrastructure", U.S. Appl. No. 10/366,958, filed Feb. 13, 2003, by inventors S. Joshi, U. Bellur, Y. Or, K. Garimella and V. Sundaresan.

U.S. Patent Application entitled "Deployment of Applications in a Multitier Compute Infrastructure", U.S. Appl. No. 10/379,617, filed Mar. 4, 2003, by inventors Y. Or, J. Casier, K. Garimella, U. Bellur, and J. Koper.

Communication Pursuant to Article 94(3) EPC dated Jan. 17, 2008 for Application No. 03 765 536.2—1243.

EPO Communication, Supplementary Search Report dated Aug. 6, 2007 for Serial No. 03 765 519.8—1243.

EPO Communication dated Oct. 18, 2007 for Serial No. 03 765 519.8—1243.

PCT International Search Report dated Oct. 23, 2003 for Serial No. PCT/US03/21401.

Communication dated May 14, 2008 in response to EPO Office Action dated Jan. 17, 2008 for Application No. 03 765 536.2—1243.

EPO Office Action for Application No. 03 765 519.8-1243, dated Apr. 6, 2009, 5 pp.

EPO Office Action for Application No. 03 765 519.8-1243, dated Apr. 7, 2009, 4 pp.

Amendment filed with the European Patent Office for Application No. 03 765 519.8-1243, dated Apr. 6, 2009, 5 pp.

Amendment filed with the European Patent Office for Application No. 03 765 536.2-1243, dated Apr. 7, 2009, 4 pp.

PCT International Search Report, Oct. 23, 2003, for International Application No. PCT/US03/21702, 5 pp.

Communication Pursuant to Article 94(3) EPC, for Application No. 03 765 505.7-1243, dated Jul. 15, 2010, 8 pgs.

* cited by examiner

Component Tables

410 Business Services

| Business Services |
|---|
| Ordering |
| Serving Web Pages |
| Order Tracking |
| ⋮ |

412 Web Servers

| Web Servers |
|---|
| Web Server 1 |
| Web Server 2 |
| Web Server 3 |
| ⋮ |

414 Subnets

| Subnets |
|---|
| Subnet X |
| Subnet Y |
| Subnet Z |
| ⋮ |

Relationship Tables

422

| Server | Subnet |
|---|---|
| Web Server 1 | X |
| Web Server 2 | X |
| Web Server 3 | Y |
| App Server 1 | Z |
| App Server 2 | Z |
| App Server 3 | Z |
| ⋮ | ⋮ |

420

| Business Service | App Component |
|---|---|
| Ordering | Web Server 1 |
| Ordering | App Server 2 |
| Serving Web Pages | Web Server 1 |
| Serving Web Pages | App Server 3 |
| ⋮ | ⋮ |

FIG. 4

CLASS core.app

| Interface Summary | |
|---|---|
| *Application* | |
| *ApplicationContext* | |
| *AppProcess* | |
| *AppProtocol* | Represents an application protocol. |
| *AppServer* | Represents a server program. |
| *AppServerCluster* | Represents a cluster of servers with identical functionality. |
| *BusinessService* | |
| *CertificateFile* | Represents Certificate File. |
| *ConfigFile* | Represents a configuration file residing on a file system. |
| *ExecutableFile* | Represents an executable file residing on a file system. |
| *JavaServerProcess* | |
| *JVMContainer* | Represents a Java Virtual Machine. |
| *PrivateKeyFile* | Represents a file containing the private key for encryption. |
| *ProcessContainer* | Represents a generic process. |
| *ProcessPool* | Represents a collection of processes that serve identical functions. |
| *ServerProcess* | |
| *SoftwareContainer* | Represents an abstraction of a runtime environment for hosting some application logic. |
| *SoftwareModule* | Represents packaged components that are deployed in a Software Container. |
| *SoftwareResource* | Represents software resources that are deployed and/or configured in a Software Container. |
| *SSLSettings* | Represents settings for using SSL. |

*FIG. 5A*

CLASS core app.web

Interface Summary

| | |
|---|---|
| ServerAlias | Represents an alias name for a Web Server/Virtual Host. |
| WebContainer | A Software Container that hosts Web applications. |
| WebResource | Represents a Web Container resource such as Virtual Host, Web Directory, etc. |
| WebServer | Represents an instance of an HTTP Server. |
| WebVirtualHost | Represents a Virtual Host resource. |

*FIG. 5B*

CLASS core app.dependencies

Interface Summary

| |
|---|
| ServiceDependency |
| TransactionalDependency |

*FIG. 5F*

CLASS core.app.web.apache

| Interface Summary | |
|---|---|
| ApacheAllowCONNECTPort | Represents a port that an Apache Proxy Server will allow CONNECT on. |
| ApacheGlobalSSLSettings | Represents Apache specific SSL settings for the overall server. |
| ApacheModule | Represents an Apache Module which extends the functionality of the base Apache Web Server. |
| ApacheModuleConfig | Configuration for an Apache Module. |
| ApacheModuleConfigDirective | A directive for an Apache module configuration. |
| ApacheModuleServerConfig | Apache Module configuration that is applicable to the base Apache Server. |
| ApacheModuleServerConfigDirective | A directive for an Apache module server configuration. |
| ApacheModuleVirtualHostConfig | Apache Module configuration that is applicable to a Virtual Host. |
| ApacheModuleVirtualHostConfigDirective | A directive for an Apache module virtual host configuration. |
| ApacheProxyServer | Represents an Apache Proxy Server. |
| ApacheServer | Represents an instance of the Apache Server program. |
| ApacheSSLSettings | Represents Apache specific SSL settings for a virtual host. |
| ApacheVirtualHost | Represents an Apache Virtual Host. |
| ApacheWebContainer | Represents the Apache Web Container environment inside an Apache Server. |

*FIG. 5C*

CLASS core.app.j2ee

| Interface Summary | |
|---|---|
| ConnectorModule | JSR77 - Represents a RAR file that has been deployed. |
| EJBContainer | A Software Container that hosts J2EE Enterprise Java Beans. |
| EJBModule | JSR77 - Represents an EJB JAR file that has been deployed. |
| J2EEApplication | JSR77 - Represents a J2EE application EAR that has been deployed. |
| J2EEDeployedObject | JSR77 - Represents a deployed application or module on a J2EE Domain/Server. |
| J2EEDomain | JSR77 - Represents a J2EE management domain. |
| J2EEModule | JSR77 - Represents a J2EE JAR, WAR, or RAR file that has been deployed. |
| J2EEResource | JSR77 - Represents resources utilized by the J2EE Server to provide the J2EE standard services required by the J2EE platform architecture. |
| J2EEServer | JSR77 - An instance of a J2EE platform product as described in the Java 2 Enterprise Edition Platform specification. |
| J2EEWebContainer | A Web Container that provides the platform for hosting JSP and servlets as specified in the J2EE specification. |
| JavaMail | JSR77 - Represents a Java Mail resource. |
| JDBC | JSR77 - Represents a JDBC resource. |
| JMS | JSR77 - Represents a Java Message Service resource. |
| JNDI | JSR77 - Represents a Java Naming and Directory Interface resource. |
| JTA | JSR77 - Represents a Java Transaction API resource. |
| RMI_IIOP | JSR77 - Represents an RMI_IIOP resource. |
| URL | JSR77 - Represents a URL resource. |
| WebModule | JSR77 - Represents a WAR file that has been deployed. |

*FIG. 5D*

CLASS core.app.j2ee.weblogic

| Interface Summary | |
|---|---|
| WebLogicAdminServer | A WebLogic Admin Server. |
| WebLogicCluster | A WebLogic Server Cluster. |
| WebLogicConnectorModule | Represents a RAR file that has been deployed to a WebLogic Server. |
| WebLogicDomain | Represents a WebLogic management domain. |
| WebLogicEJBContainer | A WebLogic EJB Container. |
| WebLogicEJBModule | Represents an EJB JAR file that has been deployed to a WebLogic Server. |
| WebLogicJ2EEApplication | Represents a J2EE application EAR that has been deployed to a WebLogic Server. |
| WebLogicJDBCConnectionPool | Represents a generic WebLogic JDBC Connection Pool which could be either standard or multi-pool. |
| WebLogicJDBCDataSource | Represents a WebLogic JDBC Data Source. |
| WebLogicJDBCDriver | Represents a JDBC Driver deployed to a WebLogic environment. |
| WebLogicJDBCMultiPool | Represents a WebLogic JDBC Multi Pool, which is a pool of connection pools. |
| WebLogicJDBCTxDataSource | Represents a WebLogic JDBC Data Source that supports distributed transactions. |
| WebLogicJMSConnectionFactory | Represents a WebLogic JMS Connection Factory. |
| WebLogicJMSDestination | Represents a JMS Destination deployed to a WebLogic environment. |
| WebLogicJMSFileStore | Represents a WebLogic file based persistence store for JMS messages. |
| WebLogicJMSJDBCStore | Represents a WebLogic JDBC persistence store for JMS messages. |
| WebLogicJMSQueue | Represents a WebLogic JMS Queue (Point-to-Point messaging). |
| WebLogicJMSServer | Represents a WebLogic JMS Server. |
| WebLogicJMSSessionPool | Represents a WebLogic JMS Session Pool. |
| WebLogicJMSStore | Represents a WebLogic persistence store for JMS messages. |
| WebLogicJMSTopic | Represents a WebLogic JMS Topic (Publish/Subscribe messaging). |
| WebLogicJTA | Represents a WebLogic Java Transaction API resource. |
| WebLogicMachine | A WebLogic Machine (HW). |
| WebLogicNodeManager | A WebLogic Machine (HW). |
| WebLogicServer | A WebLogic Server. |
| WebLogicSSLSettings | SSL Settings for a WebLogic Server. |
| WebLogicVirtualHost | Represents a WebLogic Virtual Host. |
| WebLogicWebContainer | A WebLogic Web Container. |
| WebLogicWebModule | Represents a WAR file that has been deployed to a WebLogic Server. |

*FIG. 5E*

New Scope List

| Type | Value(s) |
|---|---|
| Network | 10.10.57.0/255.255.255.0 |
| Range | 10.1.2.48-10.1.2.64 |
| Specific Ip | 10.1.2.60 (Exclude) |
| Specific Ip | 10.2.2.100 (Include) |

Add  
Edit  
Remove  
Dismiss

970 — Network  
971 — Range  
972 — Specific Ip  
973 — Specific Ip

Scope (Initial Scope) Details

○ Range of IPs: [ ]   IP: [ ]   Netmask: [ ]

○ Network:

⦿ Specific IP: [ 10.2.2.100 ]   Mode: ⦿ Include  ○ Exclude

OK   Cancel

Access List

| Type | Name | User Name |
|---|---|---|
| Firewall | Internet firewalls | wildfire |
| Firewall | Corporate firewalls | surefire |
| Host | Solaris machines | collation |
| Http Server | Apache proxies | web |
| Http Server | Apache servers | internal |
| J2EE Server | WebLogic Ordering | system-ord |
| J2EE Server | WebLogic Billing | system-bil |

[Add] [Edit] [Remove] [Dismiss]

─ 982

Access List

Type: Database Server

Database Server
database system-level access

Name: Oracle DB

Description: Oracle OLTP Database.

Username: CollationDBA

Password: *******

Confirm Password: *******

Order: 1

[OK] [Cancel]

*FIG. 11*

Testing Form [DiscoverPanel]

Status: Running
Schedule Name: Initial
Start Time: 07/20/2002 11:15

Errors
Present: Yes
Count: 2  (Warning!!!  Count & List only show errors that occurred during GUI session)
List:
 Unable to ssh into 10.10.2.59
 Unable to login the WebLogic server on 10.10.2.55:7100

[Error Log]

Activity:
 Discovered Apache Server on 10.10.2.55:8080
 Discovered 10.10.2.57
 Logging into 10.10.2.57
 Discovered WebLogic Server on 10.10.2.57:7100

Operations
[Start Initial] [Resume] [Abort] [New]

*FIG. 13*

Testing Form [DetailsTABMeeting] <3> — 1642

Summary | EJBs | Web Apps | JCAs | Other | Runtime | JDBC | JMS | JTA | JNDI | Log | Host | Service Dependencies Name: Customer Care Mgr - Server
Type: WebLogic 6.1
Version: 1.0
Domain: Business

Testing Form [DetailsTABMeeting] <2> — 1643

Summary | EJBs | Web Apps | JCAs | Other | Runtime | JDBC | JMS | JTA | JNDI | Log | Host | Service Dependencies Hostname: saturn
Hostid: 83137931
Release: 5.8
Kernel architecture: sun4u
Application architecture: sparc
Hardware provider: Sun_Microsystems
Domain: prod
Kernel version: SunOS 5.8 Generic 108528-15 April 2002
Patches:

| Number | Packages |
|---|---|
| 112187-01 | SUNWinst |
| 109128-01 | SUNWisolc |
| 109679-01 | SUNWjib |
| 109704-02 | SUNWjiu8, SUNWjiu8x |
| 110927-01 | SUNWnamox |
| 110953-02 | SUNWllc, SUNWllcx |

*FIG. 16B*

AUTOMATED DISCOVERY OF A MULTITIER COMPUTE INFRASTRUCTURE

CROSS-REFERENCE TO RELATED APPLICATION

This application is a divisional of U.S. patent application Ser. No. 10/365,185, "Topology Mapping of a Multitier Compute Infrastructure," by Yan Or et al., filed Feb. 11, 2003 now U.S. Pat. No. 7,337,184; which claims priority under 35 U.S.C. §119(e) to U.S. Provisional Patent Application Ser. No. 60/396,666, "Operational Automation Platform for Component Architectures," by Johan Casier et al., filed Jul. 17, 2002. The subject matter of the foregoing is incorporated herein by reference in its entirety.

BACKGROUND OF THE INVENTION

1. Field of the Invention

This invention relates generally to computer-implemented discovery of the topology of a multitier compute infrastructure, including those that host multitier applications. In a specific embodiment, it relates to discovery of compute infrastructures that host multitier applications that employ a software component architecture, for example based on the Java 2 Platform, Enterprise Edition (J2EE) or .NET.

2. Description of the Related Art

With advances in computing, networking and software technology, an increasing number of applications are implemented on multitier compute infrastructures. For example, many Internet applications are implemented on a compute infrastructure that can be divided into three tiers: network, compute and application. One advantage of a multitier compute infrastructure is that different tiers can function at different "levels" while still interoperating with each other. In the three-tier example, the network tier operates at the "lowest" level, the compute tier operates on top of that, and the application tier operates at the "highest" level. As a result, enterprise and other applications can be distributed among the tiers in a fashion that results in greater optimization. For example, if a certain functionality is desired, it is not required that the functionality be implemented in a monolithic piece of software installed on a particular computer in a specific location within the network. Rather, the overall functionality can be distributed among different components within the multitier compute infrastructure.

Software component architectures such as Java 2, Enterprise Edition (J2EE) and .NET are one approach which takes advantage of this flexibility. Software functionality is divided among different software components, each of which can run on a different computer located at a different network address. Each of the software components, computers and the network topology may be optimized for efficiency, security, scalability or other factors. For example, in the monolithic approach, a single code base and a single computer may be called upon to handle user requests for enhanced images, retrieve raw images from a large image warehouse and perform complex calculations to enhance the images. With the component approach, one software component and server could handle user requests, another could retrieve images, and a third could perform the calculations. Each of these can be optimized for its specific task and the same components can be used for more than one application. The overall enterprise is also more scalable since incremental capacity can be added by adding more components.

One drawback of the multitier and software component approaches is that, typically, many components are used in order to implement the desired functionality. For example, the software portion can be implemented by a large number of software components, each possibly executing on a different server, with the servers located on different networks. Software components may not even be executing on the same server each time. The real-time execution load can be load balanced among a server farm, for example. Currently, it is not uncommon for an enterprise application to have thousands of moving parts, many of which must work in tandem with each other in order for the overall enterprise application to function properly. In addition, multiple relationships between components exist within each tier, as well as across tiers of the compute infrastructure. For example, in the application tier, a web server and application server might work together to handle user requests. Cross-tier relationships can be more complex, such as those linking the web server, DNS server and access router with each other, but these often are the relationships that have a direct bearing on the availability, performance and security of the overall application.

Due to this increased complexity, managing a multitier compute infrastructure is more difficult. Tasks such as installation, configuration, activation, upgrade and monitoring of overall enterprise functions are more complex compared to a situation where a monolithic piece of code executes on a single computer in a fixed network location. This is aggravated by the fact that the component approach can significantly reduce the development cycle time. It is not uncommon to have a J2EE application undergo ten to twelve upgrades each calendar year, with two of those being major upgrades to underlying functionality. In the meantime, it is increasingly more difficult to install and monitor the upgrades.

Enterprise management capability has not kept pace with the shorter development cycles. For example, the task of deploying an upgrade is largely a manual task, even today. Initially, the application deployment team assembles the various software components making up the enterprise application, manually scans configuration files, and checks them against system documentation and physical network and compute configurations for consistency and completeness. The product of this effort is an inventory that should pinpoint omissions or conflicts prior to staging. However, as the scope of enterprise applications expands and the different tiers become more distributed, the likelihood of uncovering all issues prior to staging decreases. Missed issues are addressed by troubleshooting after deployment. But troubleshooting can be time-consuming as the root causes may depend on complex cross-tier relationships. Not only does this add expense but it can also result in lost revenue as roll out of the enterprise application is delayed. In addition, cross-tier troubleshooting and, more generally, the management of a multitier compute infrastructure are most effectively performed by dedicated teams whose members are skilled in the application, compute and network tiers. It can be difficult to find these people and the IT headcount can be the limiting factor on scaling up an enterprise operation.

Part of the problem is that currently available management tools are mostly limited to a single tier. This is because many of these tools were developed for system administrators who were responsible only for a single tier. That is, one system administrator would be responsible for networking, another for computers, and another for software loaded on the computers. Single-tier tools would give some visibility into the tier for which the system administrator had responsibility, but did not give visibility into cross-tier relationships or interactions. This is problematic since the trend is towards more numerous and more complex cross-tier relationships.

Single-tier tools also do not give direct visibility into the service which is a business' end goal. For example, in the image enhancement example, the business is really interested in the delivery of enhanced images, not in the congestion level of its internal routers or the state of its internal network. The router and network are of interest only to the extent that they impact the business service of delivering enhanced images but, with single-tier tools, it is difficult, if not impossible, to determine this relationship. As a result, the relationship typically must be manually pieced together, one tier at a time, and often using knowledge that resides only in some key employee's head. This is both time-consuming and risky—for example, if the key employee were to leave the company.

Others are attempting to address these shortcomings. Much effort is currently being spent on approaches based on monitoring. OpenView and Tivoli are examples of efforts in this general direction. Management tools can monitor individual components in the infrastructure through instrumentation with increasing detail and sophistication. This can give improved visibility into the individual component but does not effectively address cross-tier visibility or the relationship between a component and a business service. For example, processor throughput, server availability and similar metrics at best can only give indirect visibility into business services, for example whether customers have access to an enterprise application and can perform promised tasks at published service levels.

Another approach focuses on fast and/or automated deployment of application components. Loudcloud and CenterRun are two companies that appear to have efforts in this area. These tools typically automate the deployment of application components. For example, if a patch is to be distributed to 100 instances of an operating system, this tool might automate that process. However, in order to use this tool, someone must know where the 100 instances are located. Furthermore, if the patch itself requires an upgrade in some other piece of software in order to run properly, someone must also remember that. Hence, these tools might reduce the cost and error of manually deploying the patch, but they typically do not increase cross-tier visibility or visibility into business services.

Thus, there is a need for better tools and techniques for managing a multitier compute infrastructure, including those that are implementing a software component architecture.

SUMMARY OF THE INVENTION

The present invention overcomes the limitation of the prior art by providing a computer-implemented method for discovering a topology of a multitier compute infrastructure. Discovery can be roughly divided into two phases. In one phase, components of the multitier compute infrastructure and physical relationships between the components are discovered. In the other phase, non-physical relationships between the components are deduced, typically based in part on information obtained in the first phase. In one application, the components and relationships that are discovered or deduced in these phases are used to build a multitier topology map, which can be used to more efficiently manage the multitier compute infrastructure.

In one embodiment of the invention, the multitier compute infrastructure includes network, compute and application tiers; and the discovered components include network components, compute components and application components. Examples of non-physical relationships include application-level relationships, for example service dependencies and/or transactional dependencies. In another aspect of the invention, the multitier compute infrastructure implements a software component architecture (e.g., J2EE) having software components (e.g., EJBs) and the components of the multitier compute infrastructure include software components from the software component architecture.

In one implementation, an interface module includes a discovery builder, a dependency builder and a topology manager. The discovery builder discovers the components and the physical relationships. The dependency builder deduces the non-physical relationships. The topology manager builds the multitier topology map. The interface module can also include an update module for performing incremental updates to the multitier topology map. Some implementations of the interface module are based on 100% Java and/or implemented as a distributed software application.

In another aspect of the invention, components are discovered based on a series of inquiries that obtain information about components and/or relationships in the multitier compute infrastructure. The inquiries are triggered by the results obtained for previous inquiries. In one implementation, a workspace contains the results of inquiries. A discovery manager places an initial result into the workspace. A workflow engine monitors the workspace for results. New inquiries are triggered based on the results in the workspace, and the results for the new inquiries are returned to the workspace, possibly to trigger further inquiries. Commands are dispatched by the workflow engine to obtain the results for the inquiries. In this approach, inquiries can be resolved in an asynchronous, parallel manner. Furthermore, the discovery process can cross firewalls by dispatching anchor host software across the firewall.

Other aspects of the invention include methods, software, systems, devices and user interfaces relating to the methods and implementations described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 4 is a representation of one implementation of a multitier topology map.

FIGS. 5A-5F are example class definitions for one implementation of a multitier topology map.

FIG. 10 is a screen shot of one example for defining an initial seed for discovery.

FIG. 11 is a screen shot of one example for defining access information for discovery.

FIG. 13 is a screen shot of a GUI showing the progress of a discovery process.

FIGS. 16A-16F are screen shots of different views of a multitier topology map.

DETAILED DESCRIPTION OF THE PREFERRED EMBODIMENTS

Figure 1:
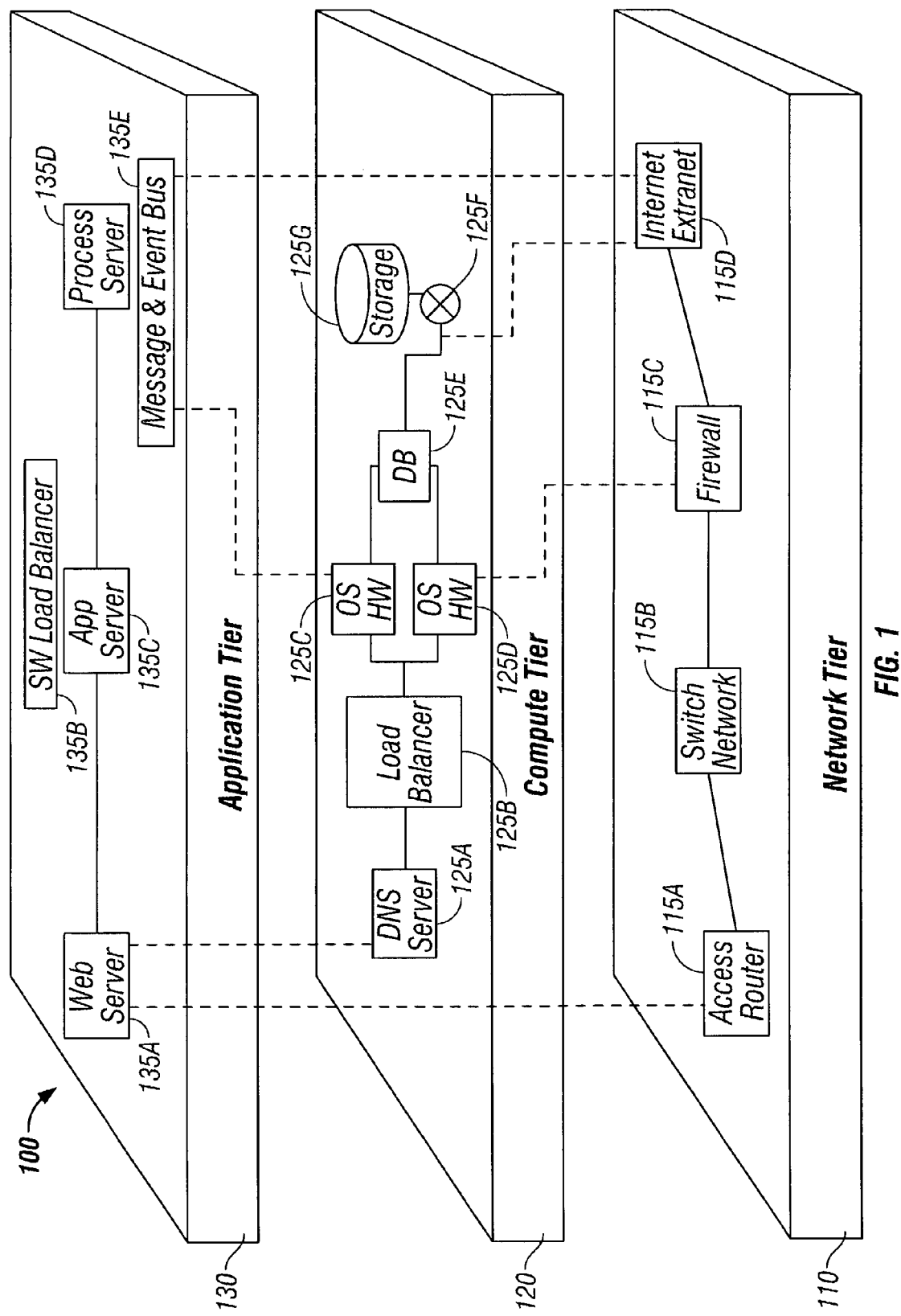
FIG. 1 is a representation of a multitier compute infrastructure.

FIG. 1 is a representation of an example multitier compute infrastructure 100. The infrastructure 100 includes multiple tiers 110, 120, 130 of components 115, 125, 135, which are interconnected to provide overall functionality. Generally speaking, the different tiers function at different "levels" and preferably function somewhat independently of each other. In one approach, each tier performs certain functions and there is a standardized interface between the tiers. The "interface" between the tiers may actually consist of a collection of standardized interfaces between individual components. In this way, individual tiers/components can be modified without affecting the other tiers/components so long as the interfaces are maintained. This provides flexibility and modularity. It also allows each tier to be optimized for its specific tasks. However, as a result of this, the tiers and the components can also be vastly different.

In the example shown in FIG. 1, the multitier compute infrastructure 100 includes three tiers: a network tier 110, a compute tier 120 and an application tier 130. This type of infrastructure is a common one for implementing enterprise applications.

The network tier 110 generally includes items that concern network communications. In a typical Internet case, it might include the access and IP network and network components hosted or implemented on these networks, such as switches, routers, load balancers, firewalls, virtual LANs (VLANs), virtual private networks (VPNs) and layer 4-7 software switches and routers. Example vendors include Cisco, Unisphere, Redback and Netscreen.

The compute tier 120 generally includes items that provide underlying system functionality that may be used by many end user applications. Typical technology areas include computing, storage and infrastructure services. Examples of components in the compute tier 120 include host hardware such as desktop computers, servers and processors (e.g., Sun, Intel, HP, IBM), operating systems (e.g., Solaris, Linux, NT, HP-UX, AIX), and storage devices including RAID arrays, disk farms, storage area networks and the like (e.g., EMC, Brocade). System services, such as DNS, LDAP and NFS, are also classified as part of the compute tier 120 in this example.

The application tier 130 generally includes higher-level software that is more directed to providing end user or enterprise functionality, as opposed to system services for example. Example components include web servers (e.g., Apache, iPlanet, IIS), J2EE application servers (e.g., WebLogic, WebSphere, iPlanet, ATG, COM+), process flow servers, messaging services (e.g., Vitria, WebMethods, IBM MQ series), packaged applications (e.g., PeopleSoft, Seibel), legacy software, and database software (e.g., Oracle).

The division of an infrastructure into tiers and the definition of each tier are not unique. The division shown in FIG. 1 is merely an example. The infrastructure 100 in FIG. 1 could be divided into tiers other than the network, compute and application tiers. For example, instead of a compute tier, the infrastructure could be divided into a storage tier and a host tier. As another example, the network tier could be subdivided into access networks, LANs and WANs. As another example, applications can also be described using multiple tiers: a division into web servers, application servers and databases is one common way to describe a multitier application. Furthermore, given the three tiers shown in FIG. 1, the components can be categorized differently. For example, the system services could be classified as part of the application tier rather than the compute tier; or load balancers could be classified as part of the compute tier rather than the network tier; or database software could be classified as part of the compute tier rather than the application tier. The granularity of the components is also not unique and components can be formed from collections of other components. For example, a server can be further broken down into different physical parts, each of which is considered a component in its own right. Or enterprise software can be broken down into its constituent software modules, each of which is considered a component in its own right. Or a cluster of servers, each of which is a component, can itself be treated as a single component.

In addition, the names given to the tiers are not meant to imply a strict division of functionality. For example, all of the network functionality in the infrastructure is not required to reside in the network tier. Load balancing has some network aspects to it, but in one implementation, hardware load balancers are part of the compute tier and software load balancers are part of the application tier. Nor is there necessarily a strict division of software and hardware. Software and hardware can reside in any of the three tiers, depending on the definitions chosen for each tier.

Figure 2:
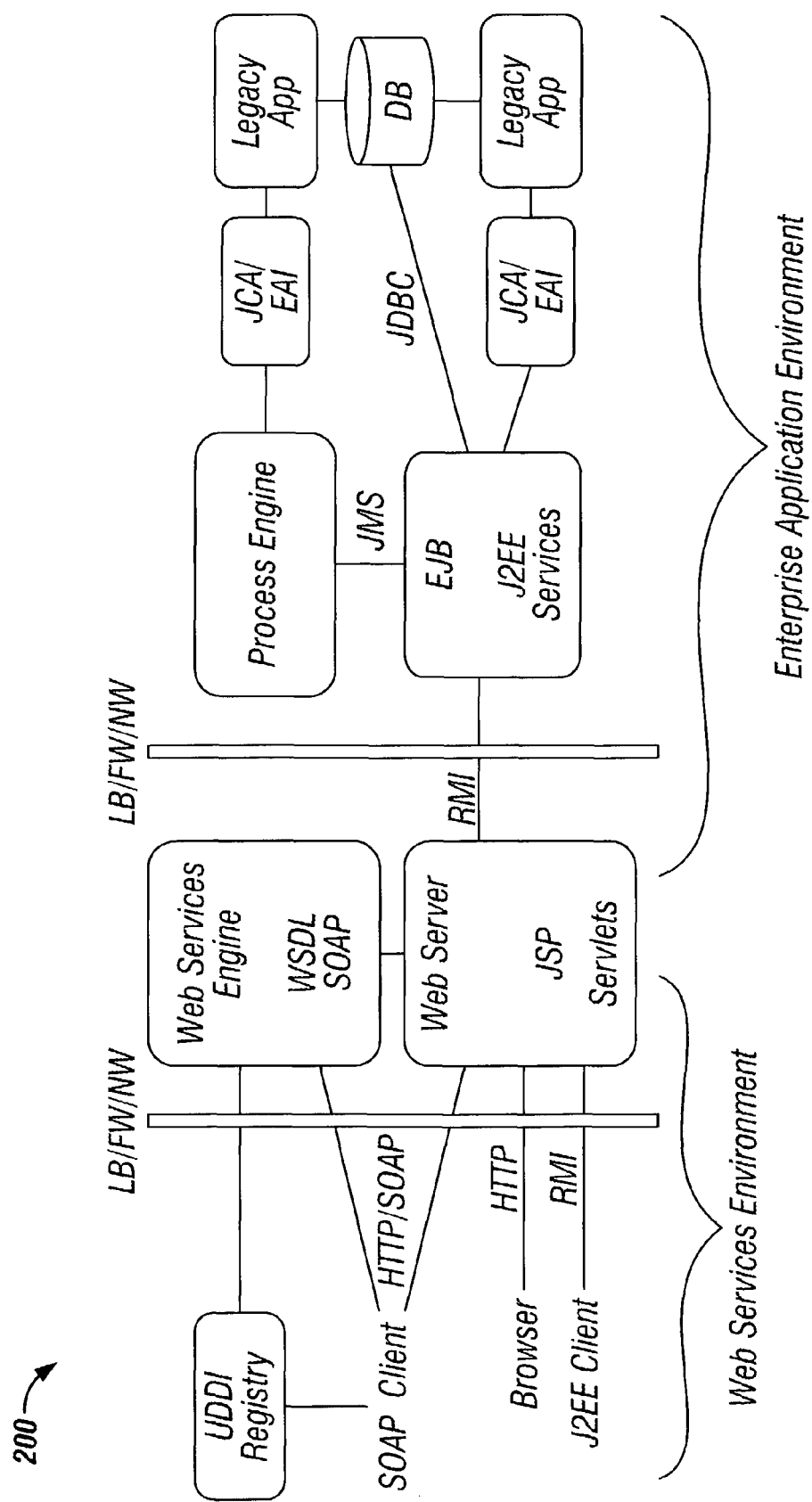
FIG. 2 is a representation of another multitier compute infrastructure.

FIG. 2 is another example of a multitier compute infrastructure 200. In this case, a web service is offered to end users over the Internet. The actual web service (e.g., booking a hotel room) can be fulfilled by many different entities over the Internet. The UDDI (Universal Discovery, Description and Integration) registry maintains a registry of handles for entities that offer the service. The SOAP (Simple Object Access Protocol) protocol provides a standardized interface for accessing the service over the Internet. The SOAP protocol uses HTTP as the transport mechanism. The remainder of the enterprise application is implemented by a three-tier architecture similar to that described in FIG. 1, possibly including web servers, business logic application servers, workflow engines and database servers. Some of the enterprise functionality is implemented using the J2EE software component architecture. Different portions of the enterprise application are separated by firewalls (FW) and are independently load balanced by either hardware or software load balancers (LB). IP connectivity is provided a network connectivity component (NW). Database redundancy is achieved using parallel servers situated at multiple sites that are synchronized with each other. The components are connected by a network that typically is either a LAN or a MAN (Metropolitan Area Network). The "enterprise" in this example is not limited to the boundaries of a business' internal network but extends to include parts of the Internet (e.g., for the UDDI and SOAP portions of the enterprise application). The Internet is used as a WAN.

Despite differences between the web services example in FIG. 2 and the enterprise application example in FIG. 1, both are examples of a multitier compute infrastructure that can benefit from the multitier topology map described below. Even though the web services reach outside a corporation's network boundary onto the Internet, it can still be managed and modeled as a multitier compute infrastructure. In one approach, a fourth Internet tier is added to the three-tier compute infrastructure and high-level functionality such as the UDDI registry and SOAP applications reside in the Internet tier. Lower level aspects of the Internet, such as network connectivity (to the extent it is known), reside in the lower three tiers: application, compute and network. In an alternate implementation, the application tier is extended to include higher-level Internet functionality.

FIGS. 1 and 2 illustrate two examples of multitier compute infrastructures suitable for use with the multitier topology map described below. Other examples of multitier compute infrastructures will be apparent. In general, enterprise applications and business services that are implemented using a multitier, component approach are especially likely to benefit from use of a multitier topology map. This is because the component aspect of the architecture likely will lead to a large number of components to be managed; and the multitier aspect likely will lead to cross-tier relationships between components, as well as complicating the management of individual components since management of the components requires knowledge about different tiers. As a result, a map that captures information about the different components and their relationships would be especially useful in this case. This is especially true since currently available management tools are generally deficient in this area.

Although management of a multitier compute infrastructure is somewhat more complex, the multitier component approach has numerous advantages which make it a real option. The division of the infrastructure into multiple tiers and into components, particularly if they are somewhat independent of each other, generally leads to increased flexibility and modularity. It also allows components to be specialized for particular tasks, thus increasing efficiency. This, in turn, can lead to lower cost as individual components are optimized and as they are shared among multiple applications or business services. It can also lead to faster development cycles as components are improved on an individual basis rather than requiring system-wide improvements, and to increased scalability as capacity can be incrementally increased by incrementally adding more components.

Figure 3A:
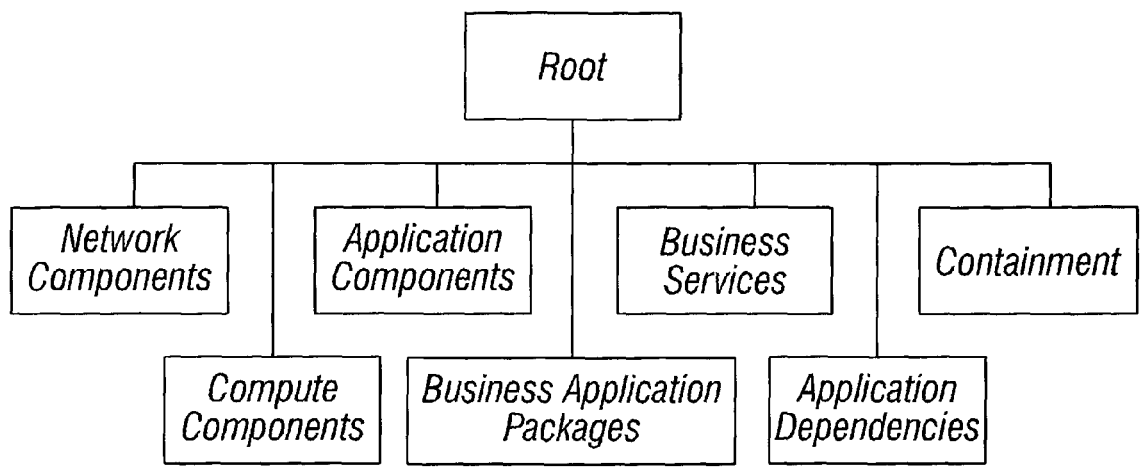
FIGS. 3A-3C are data hierarchies of multitier topology maps for the compute infrastructure shown in FIG. 1.
Figure 3B:
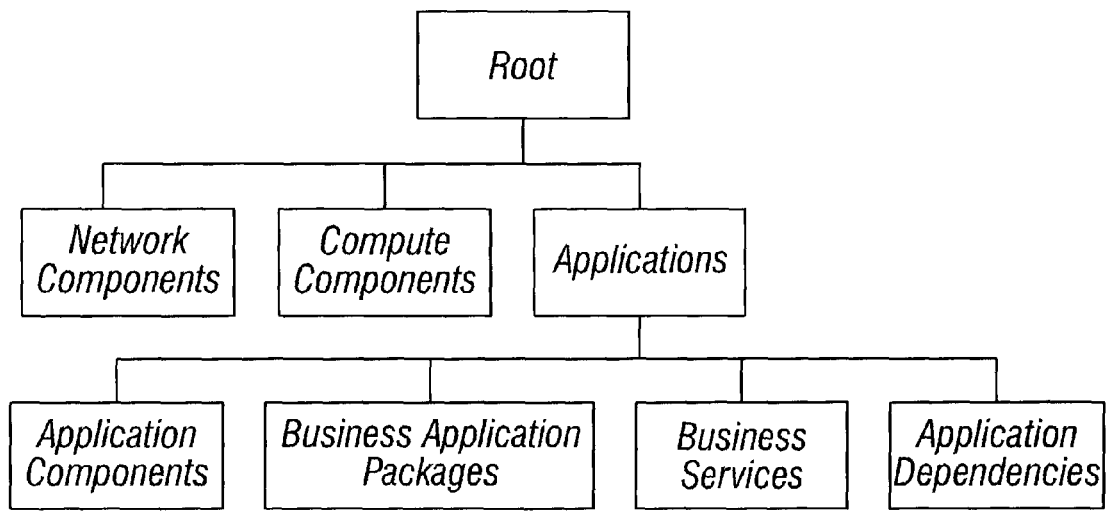
Figure 3C:
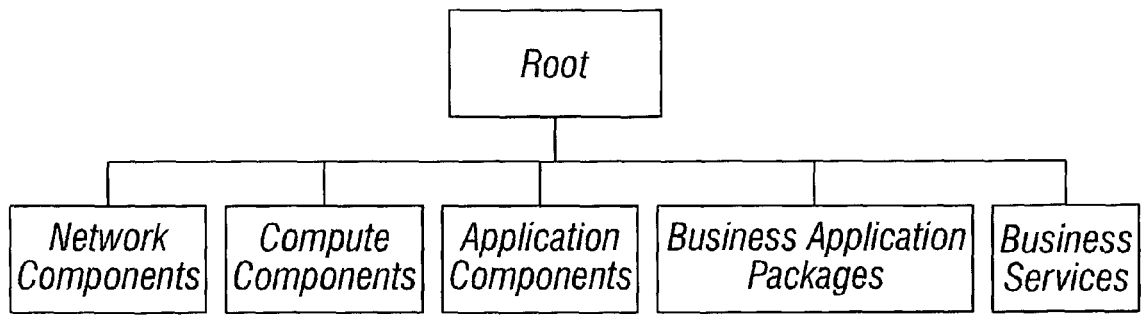

FIGS. 3A-3C illustrate three examples of multitier topology maps that can be used to manage the example multitier compute infrastructure shown in FIG. 1. At a general level, a topology map describes the topology of a compute infrastructure. In other words, it identifies components within the infrastructure and indicates relationships between various components. The topology maps in FIGS. 3A-3C are multitier in the sense that they identify components from two or more tiers and at least one of the relationships in the map is a cross-tier relationship. A topology map is useful in managing a compute infrastructure because it documents the topology of the infrastructure. The multitier topology map is especially useful because it provides visibility into cross-tier interactions and relationships.

The visibility provided by the multitier topology map has many benefits. It can reduce the time required to deploy new applications, as this process is automated. It can reduce the time required to troubleshoot faults within the infrastructure, as relationships between components are more easily identified. It can reduce the IT head count needed to support the infrastructure, as there is more documentation describing the infrastructure. It can also facilitate greater optimization of the infrastructure, as key relationships in the infrastructure are identified and better understood. As a result, the business typically can reduce its time to implement new deployments, business processes and policy changes. It typically can also gain a better understanding of the relationship between the multitier compute infrastructure and its ultimate business goals.

Returning to FIGS. 3A-3C, the examples are illustrated using the following: network components, compute components, application components, business application packages, business services, application dependencies, and containment. The first five are components; the last two are relationships. Network components, compute components and application components were described above.

Relationships describe the association between two or more components. In FIG. 1, the solid lines between components indicate intra-tier relationships and the dashed lines indicate cross-tier relationships. Containment and application dependencies are two types of relationships. Containment is primarily a relationship of subsistence between components, often of different tiers. For example, an application server instance (application tier) is executing on a particular hardware server (compute tier) resident on a particular subnet (network tier). There is a containment relationship between the application server instance and the hardware server, and between the hardware server and the subnet. By implication, there is also a containment relationship between the application server instance and the subnet. Containment relationships are often reflected in the physical set up of the compute infrastructure. Hence, they can often be discovered by taking a physical inventory of the multitier compute infrastructure.

Application dependency is a relationship between components at the application-level, indicating that one application-level component somehow depends on another application-level component. The term "application-level component" is used here because, in this example, the term likely is not limited to just application components. Two examples of application dependency include transactional dependency and service dependency. Transactional dependency means that in order for application-level component X to service a user request, application-level component Y must be available. For example, X may be a web server responding to requests for data and Y is the corresponding database server. Service dependency is more infrastructure oriented. Service dependency refers to application-level components that are not in the direct path of a user request, but that are still necessary. Examples include components such as DNS, security or session services.

As with tiers and components, the selection and definition of relationships to be used in the multitier topology map is not unique. Other types of relationships and different definitions for the relationships described above will be apparent. For example, in an alternate implementation, service dependency and transactional dependency can be lumped together in a single category. Or transactional dependency can be defined as, in at least N % of user requests, Y is required. Or the relationships or components can be defined at a different granularity. For example, transactional dependency may mean that servicing a request from web page X requires a certain portion Y of a database, as opposed to web server X requires database Y.

Installation dependency and activation dependency are two more examples of relationships. Installation dependency is primarily used for deployment of software. It describes the dependency of one software package on another for purposes of installation. For example, installation of a WebLogic application server on a specific hardware server might depend on the existence of a particular version of JDK being installed on that hardware server. Activation dependency is more run-time oriented. It describes the order in which processes that form an application are started or shut down. It can also describe the delay required between the activation of the various processes.

As a final example, logical clustering is an item that has aspects of both a relationship and a component. It supports the formation of hierarchies. For example, execution of software may be load-balanced among hardware servers in a server farm. The logical cluster relationship can be used to define a new component that includes the load balancer and the hardware servers. A containment relationship exists between the software and the logical cluster. The relationship aspect of logical cluster is that it defines a certain relationship between components—the load balancer and hardware servers in this case. The component aspect is that the logical cluster itself is a component and can have relationships with other components. As used in this example, logical clusters are limited to lower level clusters, for example clusters of hardware and/or more infrastructure-related software.

Business application packages also support the formation of hierarchies, but at higher levels of abstraction. For example, an enterprise application implemented using the J2EE software component architecture might consist of a number of Enterprise Java beans (EJBs), each possibly executing on different hardware. In one classification, each EJB is a separate application component and the overall enterprise application is defined as a business application package that includes the collection of EJBs.

As another example, the accounting function within a business may rely on many different pieces of software, each of which is defined as an application component. It can be useful to define a business application package "Accounting" that includes these different pieces of software. This has several advantages. For example, it gives visibility into which parts of the multitier compute infrastructure are affected by the accounting department, and also how the accounting department might be affected by changes in the multitier compute infrastructure. Again, definitions and granularity are not fixed. For example, a business application package "Accounts Receivable" might be defined in addition to or instead of the Accounting business application package. The Accounting business application package can be defined as including the Accounts Receivable business application package. Other variations will be apparent.

Business services are logically similar to business application packages but are qualitatively different. They are similar in the sense that a business service also supports the formation of hierarchies, in much the same way that business application packages do. Both provide higher levels of abstraction. However, as used in this example, business services provide a business centric window into the multitier compute infrastructure. They provide visibility into functions that are directly relevant to the business of the corporation—for example, order placement and tracking, serving web pages, and/or meeting service level commitments. In contrast, business application packages, while they also represent higher-level functionality, are more concerned with how a singular functionality is designed and deployed. For example Accounting may be a business application package, but a Vendor Payment History request is more likely to be a business service that may use the Accounting and the Vendor Contact Management business application packages. Other examples of business services can include Billing Dispute request, Trouble ticket entry, and Inventory Status Summary request. As another example, customers typically are concerned with order placement (a business service) but they generally could care less that order placement is implemented using business application packages such as Order Management, Inventory Management and Billing.

Business services offer the business throughput data that the CIO and executive management use to understand the revenue, expense and/or customer service performance of the business. In other words, a business service defines the relationships between the components in the multitier compute infrastructure and the enterprise's actual business. As a result, they can provide visibility into questions such as the following. If order placement is not operating correctly, which components might be the cause? If certain components in the infrastructure are to be taken offline, what business services will be affected—order placement, web page serving, availability of certain services, other? If a business service is too slow, where is the bottleneck and why? Because of their importance and high level of abstraction, business services typically are managed as a first class entity in the system.

As an example, an ordering service might include two transactions: one to actually place the order for a product and one to check on the status of the fulfillment of that order. The first transaction involves a web server, a B2B server that connects with a credit card company, an application server that holds the business logic for processing the order and a backend database, in addition to other network resources. The second transaction involves an overlapping set of components. In a traditional IT management structure, a network administrator is responsible for the network resources, a systems administrator is responsible for the various servers, and an applications administrator is responsible for deploying, shutting down and restarting these applications. However, none of these views gives significant visibility into the ordering service itself. The CIO and CFO are more interested in the performance of the ordering service (as opposed to any one tier) since ordering is directly linked to the health of the company's revenues for the quarter. A report on the availability rate of an individual server is not particularly interesting. The CIO is more interested in the availability of the ordering service as a whole. To accomplish this task, a business service "Ordering" is defined that includes the relevant components.

In another example, the sales force has a software system for the sales cycle, including order entry. The manufacturing division has separate software for inventory control and yet other software for tracking work in progress on the factory floor. The shipping dock has its own software for logging shipments, and the accounting department has yet another system to track accounts receivable. While each of these areas is interesting in its own right, the business is interested in tracking the progress of ordered products through the entire production process. Therefore, a business service "Order Tracking" is defined to include these different components.

As with business application packages, business services can be defined in different ways and at different granularities. In the ordering example, "Order Placement" and "Order Fulfillment" can be defined as two separate business services, and the "Ordering" business service defined in terms of them. As another example, "Order Tracking" can be defined in terms of the basic application components used to implement accounts receivable. Alternately, it can be defined in terms of an "Accounts Receivable" business application package, which in turn has been defined in terms of the basic application components. Note that, similar to logical clusters, business application packages and business services have aspects of both a relationship and a component.

In the example of FIGS. 3A-3C, business application packages and business services typically are defined in terms of application-level components: typically application components, business application packages and business services. The definition typically also indicates relationships between the components, either explicitly or by inheritance or implication. In the example of FIGS. 3A-3C, application components typically are relatively low level components for which relationships with compute components, network components and other application components are either explicitly indicated or easily discovered. For example, a web server executing on a particular hardware server on a particular subnet has a dependency on that hardware server and subnet. These types of relationships typically are not repeated in the higher-level definitions of business application packages and business services, but are included by inheritance. Thus, a business service "Web Page Serving" can be defined as dependent on the web server and, by implication, also dependent on the hardware server and subnet.

Returning now to FIGS. 3A-3C, FIG. 3A shows a hierarchy for a multitier topology map that contains objects for both components and relationships. The term "object" is used throughout in its general sense and does not imply implementation using object-oriented programming. Network components, compute components, application components, business application packages, business services, application dependencies and containment are all categories that extend directly from the root. One advantage of this approach is that components and relationships are separated so that operations that affect only one or the other can be more efficiently implemented. Another advantage is that the relationships are explicit rather than implied. Hence, there is less need for special processing to handle implied relationships.

The multitier topology map in FIG. 3B is application-centric. In this case, the categories extending from the root are network components, compute components and applications. The subcategories extending from "applications" are application components, business application packages, business services and application dependencies. Containment is not defined in separate objects. It is limited primarily to physical relationships, which are defined in the objects for the corresponding components. For example, the object for a software component indicates the hardware server on which it executes, or the object for a hardware server indicates the subnet on which it resides. Business application packages and business services are defined primarily at the application-level, which is why they are classified under "applications." However, lower level dependencies are defined by inheritance.

FIG. 3C is an example in which relationships are not defined in separate objects. The categories extending from the root are all components: network components, compute components, application components, business application packages, and business services. Relationships are defined in the objects for the corresponding components. For example, if a web server has a transactional dependency on a database server, the object for the web server and/or for the database server would indicate this. One advantage of this approach is that the object for a component gives a more complete picture of what relationships affect that component. In one embodiment, each object for a component indicates all the relationships that affect the component.

FIG. 4 is an example implementation of a multitier topology map. The map is implemented using two types of tables: one that identifies components and one that indicates relationships. In this example, tables 410, 412 and 414 are component tables and tables 420 and 422 are relationship tables. Table 410 identifies business services: Ordering, Serving Web Pages, and Order Tracking, to continue the example given above. Table 412 identifies web servers 1-3 and table 414 identifies subnets X, Y and Z. Table 420 indicates which application components are relevant to each business service. In this example, Ordering depends on web server 1 and application server 2 (the table listing applications servers is not shown in FIG. 4). Serving Web Pages depends on web server 1 and application server 3. Table 422 indicates where in the network different servers reside. By inheritance, it can be determined that Ordering depends on subnet X (which contains web server 1) and subnet Z (which contains application server 2).

In this example, the relationship specified by a table is largely defined by the definition of the table, as opposed to additional information contained in the table. For example, table 422 is defined as the table that contains pairs of servers and subnets for which a containment relationship exists. The existence of a record with web server 1 and subnet X in table 422 indicates that there is a containment relationship between the two. This largely defines the extent of this particular relationship.

In contrast, the component tables typically do not fully define the components. Rather, each entry typically is a pointer to a data structure that contains additional information beyond just the component's identity. For example, FIGS. 5A-5F are some of the component classes used to implement the application branch of the application-centric hierarchy shown in FIG. 3B. The classes in FIGS. 5A-5F are core.app, core.app.web, core.app.web.apache, core.app.j2ee, core.app.j2ee.weblogic, and core.app.dependencies. The class name shows the hierarchy. For example, core.app.web.apache is a subclass of core.app.web, which is a subclass of core.app. Each subclass can inherit some or all of the attributes of the parent class. For clarity, inheritance is not shown in FIG. 5. The class core.app corresponds to "applications" in FIG. 3B. The class core.app.dependencies corresponds to "application dependencies." Two of the objects in this class are TransactionalDependency and ServiceDependency, which were described previously. The remaining classes are various flavors of "application components" or its subclasses. For example, core.app.web are web servers and core.app.web.apache refers to Apache web servers. Similarly, core.app.j2ee refers to application components implemented using the J2EE architecture and core.app.j2ee.weblogic refers to WebLogic versions.

FIGS. 3-5 are merely examples. Other implementations will be apparent. Referring to FIG. 3, there are many other ways to organize a multitier topology map. For example, each tier of the topology may have an independent hierarchy with details focused on that particular tier and no relationships to the other tiers. In alternate embodiments, the multitier topology map can be non-hierarchical. An example would be a list of objects and attributes that pertain to a particular technology with no reference to how they would combine in a usage model.

In a preferred embodiment, the multitier topology map complies with the Distributed Management Task Force's (DMTF) Common Interface Model (CIM). The map is hierarchical, the root is the CIM core, and the different categories are either CIM categories if they are available or CIM extensions if they are not.

FIG. 4 is also just an example implementation. Other implementations will be apparent. For example, relationships can be indicated in a number of ways. They can be explicitly defined, for example as shown in table 422 between web server 1 and subnet X. They can be indicated by inheritance, for example in FIG. 4 with respect to the dependency of "Ordering" on subnets X and Z. They can be indicated in the objects of the components that they affect as opposed to in a separate object for the relationship. They can be indicated by the names given to objects or classes. For example, if "core.compute.webserver" is an object identifying web server 1, then "core.compute.webserver.subnet" could be the subnet where web server 1 resides. Other approaches and combinations of approaches, both for relationships and components, will be apparent.

Similarly, FIG. 5 is also just an example. Classes and objects can be defined differently, given different names, and arranged differently with respect to hierarchy and/or inheritance. Alternately, relationship information can be captured implicitly in programmatic code created at run-time. Approaches that do not utilize inheritance can also be used. For example, relationships can be implied by the use of identifier attributes that refer to another object.

Figure 6:
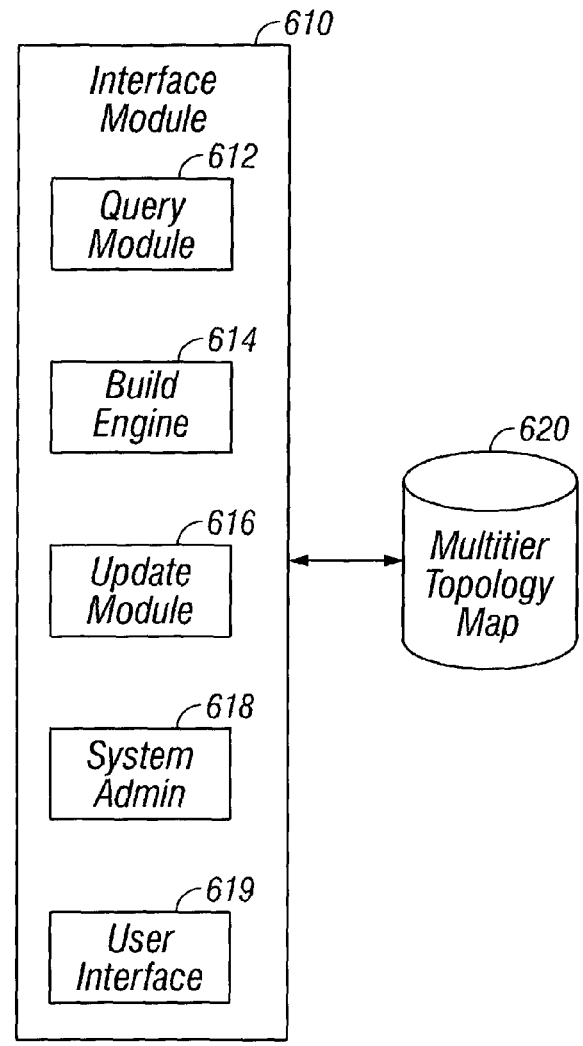
FIG. 6 is a block diagram of an interface module coupled to a multitier topology map.

FIG. 6 is a block diagram of a computer apparatus that includes an interface module 610 to a multitier topology map 620. The interface module 610 provides an interface for accessing and/or manipulating the multitier topology map. The interface can be used by human users and/or other software. Different interface modules can implement different functionality, including some, all or none of the functionality described below.

The example interface module 610 shown in FIG. 6 includes a query module 612, a build engine 614, an update module 616, system administration 618 and a user interface 619. The first three interact with the multitier topology map 620. System administration 618 performs general housekeeping tasks and may also interact with the multitier topology map 620. The user interface 619, graphical or otherwise, provides a user interface for humans. In some sense, it acts as a gateway for humans to the functionality of the other modules. It typically interacts indirectly with the multitier topology map 620, via the other modules.

In more detail, the query module 612 accesses the multitier topology map 620 in order to answer queries. For example, if a user would like to obtain a list of components that affect a specific business service, the dependencies associated with a specific component, or the components and their connections within a specific tier, the query module 612 obtains the information from the multitier topology map 620.

The build engine 614 and update module 616 are responsible for acquiring and maintaining the information in the multitier topology map 620. For example, the build engine 614 typically takes an inventory of components in the multitier compute infrastructure and identifies relationships between the components. The build engine 614 can also accept manual input in building the multitier topology map 620. For example, higher levels of abstraction such as business application packages and business services may or may not be automatically discoverable from the multitier compute infrastructure itself. If they are, the build engine 614 could discover them and automatically include them in the multitier topology map 620. If they are not discoverable or the build engine 614 does not discover them, they can be included in the multitier topology map by manual input. The update module 616 is responsible for incremental updates to the multitier topology map 620.

In one approach, the build engine 614 initially builds the multitier topology map "from scratch." The update module 616 keeps the multitier topology map current by periodically updating it, with the build engine 614 rebuilding the entire multitier topology map from scratch every so often. In another approach, there is no update module 616. Rather, the build engine 614 builds the entire multitier topology map from scratch each time. The multitier topology can also be built or updated in parts, rather than in its entirety each time.

Figure 7:
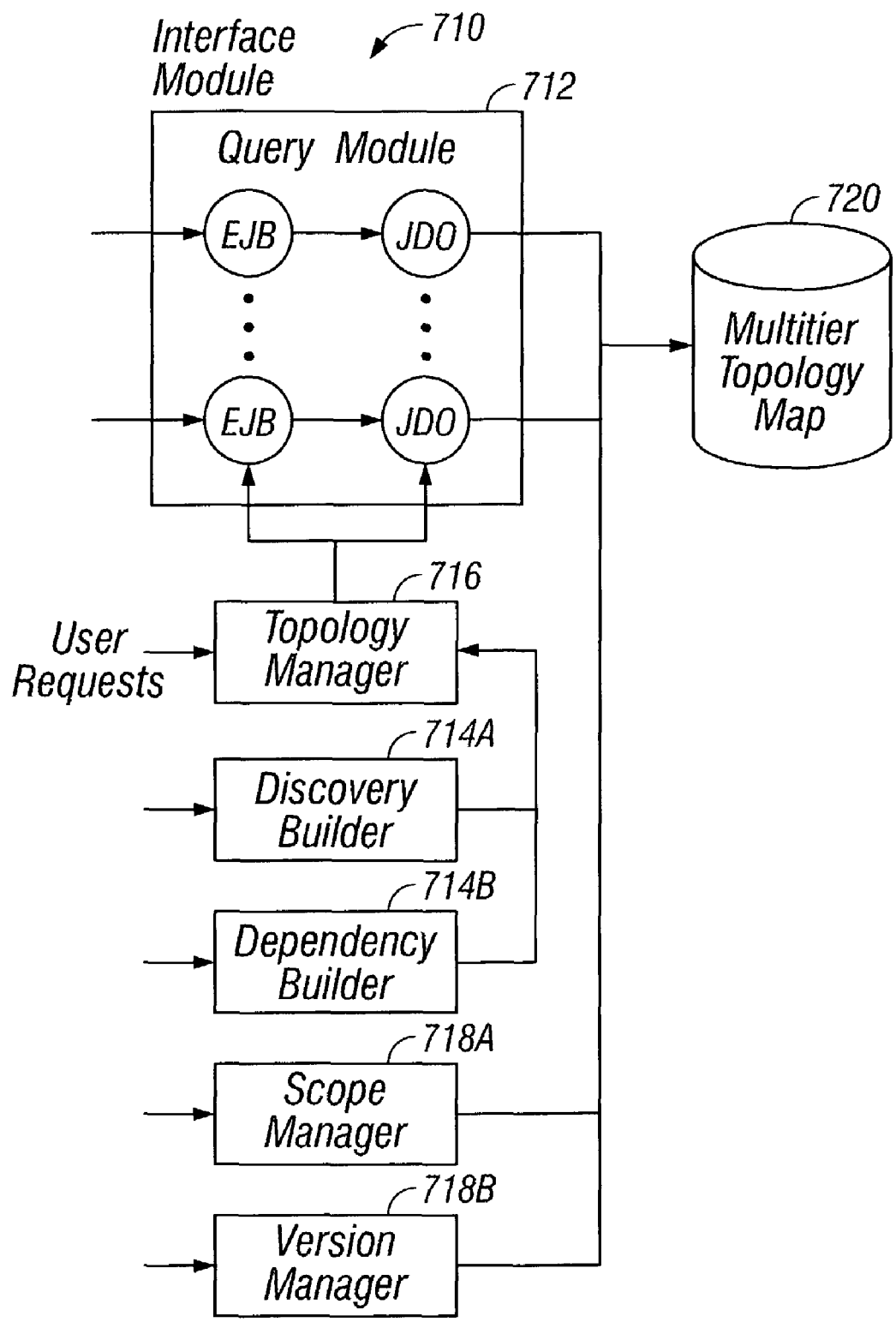
FIG. 7 is a block diagram of one implementation of an interface module.

FIG. 7 is a block diagram of an example interface module 710 implemented using the J2EE architecture, and suitable for use with the three-tier compute infrastructure of FIG. 1. In one implementation, the interface module 710 is based on 100% Java. Different types of activity in the interface module 710 use different Java technologies. For example, business logic can be implemented as Java code and/or EJBs. Protocol adaptors can be used for SNMP, HTTP, RMI, etc. Communication and events can be implemented using Java Spaces. Management agents can be implemented by JDMK network enabled agents. Portals can be implemented by JSP and servlets. This approach leads to modularity and scalability. It also permits the interface module 710 to be implemented in a distributed manner.

The multitier topology map is stored in database 720. The interface module 700 includes the following components: query module 712, topology manager 716, scope manager 718A, version manager 718B, discovery builder 714A and dependency builder 714B. The arrows in FIG. 7 indicate the direction of requests between the different components. That is, the component at the tail of the arrow makes the request and the component at the head of the arrow services the request.

Reads from the multitier topology map 720 are handled primarily by the query module 712 and writes to the multitier topology map 720 by the topology manager 716. The query module 712 is implemented by entity Enterprise Java beans (EJBs) that communicate with Java data objects (JDOs). The JDOs are used for persistence. The EJBs are used for distribution of data. For example, they directly service client requests for portions of the multitier topology map.

The topology manager 716 is responsible for the mechanics of updating and maintaining the multitier topology map 720. For example, manual changes to the multitier topology map 720 are made via the topology manager 716. Changes to the multitier topology map 720 resulting from the initial build and subsequent updates are also carried out by the topology manager 716. The topology manager 716 is implemented by session EJBs that communicate with the JDOs.

The scope manager 718A and version manager 718B provide functionality that is more administrative in nature. The scope manager 718A defines the boundaries of the multitier topology map. For example, the multitier compute infrastructure being mapped may be defined by a range of IP addresses, or a mask defining a range of addresses. The scope manager 718A enforces this boundary, for example during the build process.

The version manager 718B supports versioning of the multitier topology map 720. In other words, "snapshots" of the multitier topology map can be taken at different times and saved as different versions. This is useful in many situations. For example, if a change made to the multitier compute infrastructure is not working, it can be undone by reverting to an earlier version. Alternately, the new version can be compared to the old version, showing the differences between the two versions, thus allowing for targeted troubleshooting. Alternately, an old version can be saved and used as a baseline against which to compare new configurations.

In one embodiment, the concept of "deployment versions" is used to help track dependencies of an application on, for example, the operating system version and patch levels, versions of third party software, and configuration of the application itself such as database connections, thread counts and other parameters. A deployment version depends on the version numbers of the other applications that are used by the application in question. It also depends on the configuration, including the set of target machines, their operating system versions and patch levels, the versions of the third party software on which the application depends on each machine, clustering configurations, etc. In one embodiment, only a change in configuration can cause a change in the deployment version. In this case, simply installing a new version of software without a corresponding reactivation of the software does not change the deployment version, but activations that include changes to configurations do change the deployment version. A user can roll back to a previous deployment version provided that it does not cause a conflict with respect to resources shared by other applications.

The discovery builder 714A and dependency builder 714B are used to build the multitier topology map, as will be described in greater detail below. Their results are sent to the topology manager 716, which updates the multitier topology map 720. One advantage of separating the topology manager 716 from the builders 714 is for efficiency, since the builders 714 can discover a large amount of information in a short period of time.

System administration functions can be handled by the topology manager 716 and/or additional modules (not shown). For example, a service console permits user interaction with the interface module 710. In one embodiment, the user console can be accessed via the web and also via a dial-up line for remote operations. It provides a variety of functions. For example, wizard-type interfaces are used for deployment, provisioning and rollback of application-level components. Prior to these activities, service and policy definitions can be entered for each component. In addition, the wizards incorporate process steps that can be used for change management and audit control. The user console can also provide real-time activity monitoring of application-level components, current alarm information and root-cause alarm trace views. Additional tools allow configuration of monitoring and maintenance activities such as log file, disk and scheduling management. Standard administrative functions, such as setting up users, roles and authorizations, are also supported.

Note that in this example, outward facing components—the query module 712, topology manager 716, scope manager 718A, version manager 718B, discovery builder 714A, and dependency builder 714B—are implemented by EJBs with well-defined interfaces. Thus, other software can communicate with the interface module 710 by utilizing the EJB interfaces.

Figure 8:
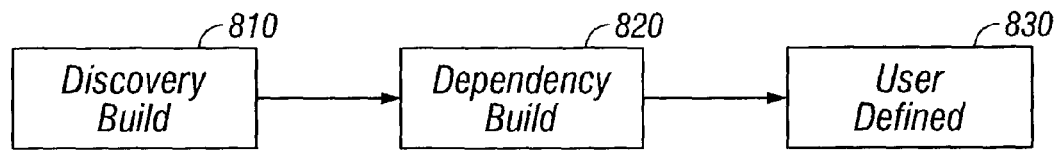
FIG. 8 is a flow diagram illustrating one method of building a multitier topology map.

FIG. 8 is a flow diagram illustrating one method for building a multitier topology map 720 using the interface module 710 of FIG. 7. In step 810, the discovery builder 714A generates an initial inventory of components in the multitier compute infrastructure and also discovers lower-level relationships between the components. It feeds this information to the topology manager 716, which populates the multitier topology map 720. The discovery builder 714A's focus is lower level compared to the two remaining steps. Referring to FIG. 3, the inventory typically will identify most of the network components, compute components and application components, as these components are easily discoverable. They are more physical and less abstract in nature, as compared to business application packages and business services. In addition, many of these components currently have interfaces that allow for their automatic discovery. The relationships discovered by the discovery builder 714A also tend to by more physical and lower level in nature, for example physical containment of components (e.g., Apache web server X resides on physical server Y located at IP address Z). At the conclusion of step 810, the multitier topology map 720 includes the majority of building block components. Additional components identified in subsequent steps tend to be higher level and constructed from the basic components discovered in step 810. The majority of physical relationships are also discovered in step 810. As a result, the remaining steps 820, 830 operate primarily at the application-level. For example, new components typically are defined in terms of previously existing application-level components but inherit any dependencies on network and compute components.

In step 820, the dependency builder 714B uses the information generated by the discovery builder 714A to discover higher-level relationships. The algorithms used in the dependency builder 714B generally have more intelligence than those in the discovery builder 714A. This is because the dependency builder 714B takes an additional step beyond the discovery builder 714A in deducing relationships, many of which are not apparent from just a physical inspection of the multitier compute infrastructure. However, the dependency builder 714B typically cannot deduce all of the relationships that will be useful to the end user. For example, some relationships simply are not very visible from observing the multitier compute infrastructure at any level. It simply may not be clear that components X, Y and Z work together to enable an end user to place an order, for example.

In step 830, the user can manually define higher-level components and relationships, for example business application packages and business services. This final step allows the user to bridge the gap between a map that is focused on individual components or individual tiers, to one that is focused on the value proposition of the enterprise. Components can be grouped and related to one another in a way that better reflects the enterprise's business rather than the physical layout of the multitier compute infrastructure. In one approach, graphical tools permit the user to define these higher-level components and relationships. For example, the user could select a name for a business service and then drag and drop components into the business service icon to indicate that the business service depends on those components.

Figure 9:
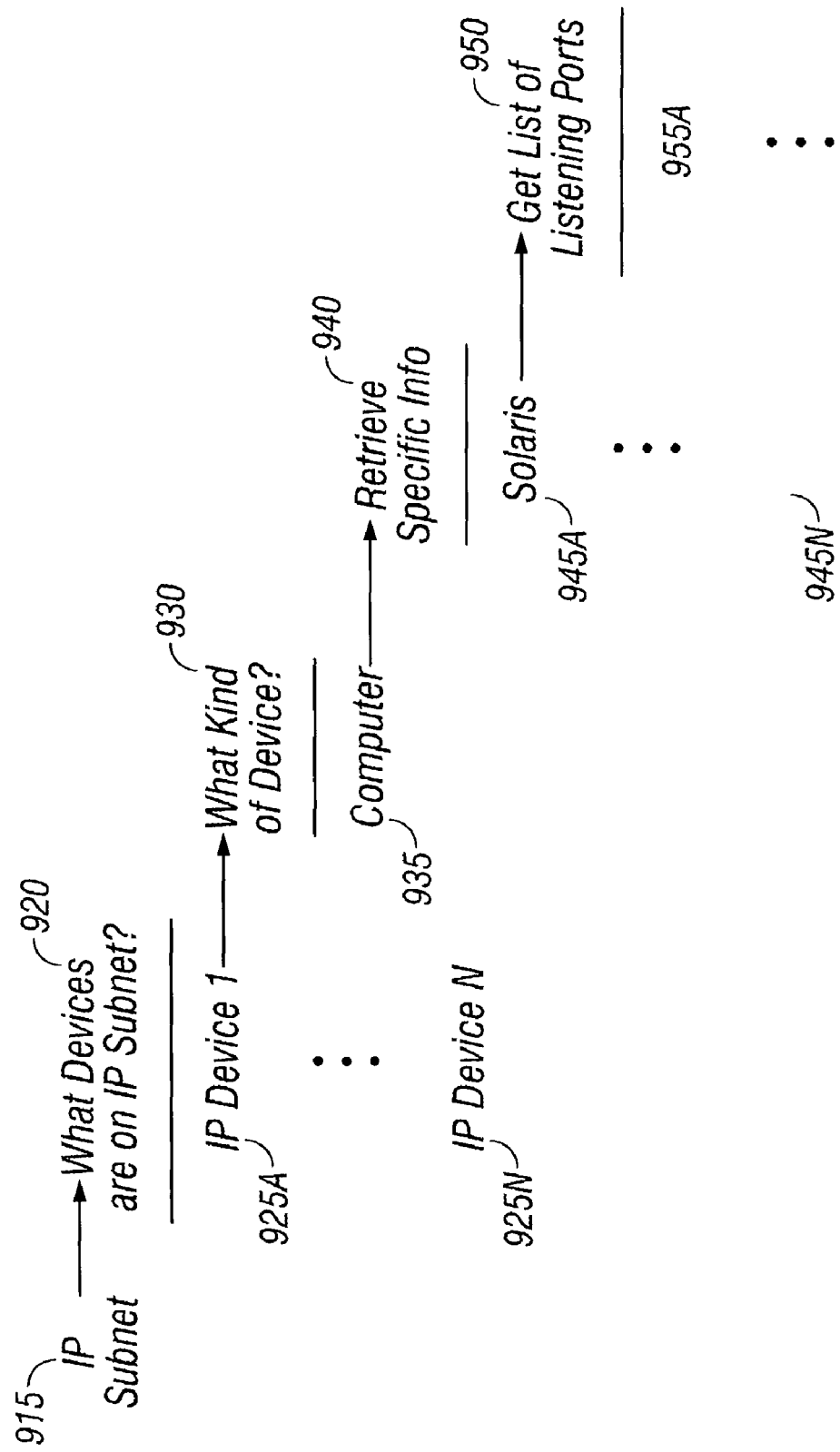
FIG. 9 is a diagram of one method for discovering components.

FIG. 9 is a flow diagram of one implementation of step 810 for discovering components. In this example, the primary focus of the discovery builder 714A is to discover the application components, their version and configuration information, and their relationships to other application components as well as to relevant compute and network components. The workflow can be automatically guided by the discovery builder 714A and/or can be interactive to solicit input from the user during and after discovery. Alternately, the workflow can be driven programmatically by published APIs.

The result of the discovery process 910 is an inventory of application components and physical topology, and corresponding relationships. In this embodiment, the relationships are discovered as a byproduct of making the inventory of components. The inventory of components and relationships form the basis for an initial version of a multitier topology map, although usually not the final version. Steps 820 and 830 in FIG. 8 typically will further develop the multitier topology map. The in-progress multitier topology map is stored in the database 720 using an extension of the CIM standard. This simplifies access by other functional components of the interface module 700. The CIM extensions also ensure that discovered relationships between the components are described and retained. In contrast, a process that simply produces an inventory of network, compute and application components does not include any relationship information and typically would require a second, manual step to uncover and inventory the relationships. The discovered multitier topology map can be presented to the user for verification.

Referring to FIG. 9, the discovery process 910 begins with an initial seed that defines the boundaries of the discovery process. An example of an initial seed is a subnet for which all IP addressable devices need to be discovered. The initial seed may define the entire extent of the multitier compute infrastructure but it could just as well define only a portion of the infrastructure. This latter approach is useful if the build for the entire multitier compute infrastructure is done in parts or if only one portion of the infrastructure need be built.

FIG. 10 is a screen shot of a window used to define the initial seed. In this example, the multitier compute infrastructure includes the entire subnet defined as 10.10.57.0 (row 970), further includes the range 10.1.2.48-10.1.2.64 (row 971) but excluding 10.1.2.60 (row 972), and additionally includes 10.2.2.100 (row 973). Window 975 shows details of highlighted row 973, demonstrating how the user can define the initial seed.

The discovery process 910 is a series of inquiries, each of which is triggered by a result from the previous inquiry. In other words, a result from a previous inquiry can also be a seed for the next inquiry. If there is no next inquiry, then the result is a leaf node in the inquiry tree. It is possible for one inquiry to have many results, many of which are also seeds. It is also possible for one seed to trigger many inquiries. Assuming that the initial seed defines an IP subnet, the initial seed triggers the next inquiry 920, which is "What devices reside on the IP subnet?" The results 925A-N are shown in FIG. 9 as IP device 1 to IP device N. Each of these results 925A-N triggers a next inquiry. FIG. 9 follows the inquiry tree from IP device 1. The next inquiry 930 is "What kind of device is it?" The result 935 is "computer." For this inquiry, there is only one result but there are a number of different possibilities. For example, the device could have been a switch, router, load balancer, firewall, etc.

The next inquiry 940 is "Retrieve specific information about the computer." Note that this general inquiry could be implemented as multiple inquiries: "What operating system and patch level is running?", "What hardware architecture and version?", etc. The inquiry is answered typically by using generally available services, looking at filenames, etc. More generally, the inquiries in the discovery process 910 are answered by making use of, for example, known application component signatures, J2EE class reflection and introspection, service port scans and connection tracing apart from standard IP discovery methods. The discovery process can also look at, for example, HTTP, JNDI, JDBC, service and data file connections. Note that inquiry 940 differs depending on result 935. If the device were a router instead of a computer, different types of information would be sought and different techniques would be used to obtain that information.

Assume that one of the results 945A-N of the inquiry 940 is that the computer is a Solaris box. Other possible answers could include Windows or IBM boxes, for example. The inquiry 950 resulting from the "Solaris" result is "Obtain a list of listening ports." One purpose of this inquiry is to determine relationships between this device and other components. However, this type of inquiry also results in the possibility of multiple paths to the same component. One approach is to cut off any redundancy. For example, if the inquiry tree from the Solaris box grows to touch another component that is already represented in the tree, then that branch of investigation is terminated. Another approach is to permit some redundancy in order to double check results.

The inquiry tree preferably is designed to match the structure of the multitier topology map. For example, if the multitier topology map contains the classes shown in FIGS. 5A-5F, then the inquiry tree preferably has corresponding inquiries. In other words, the inquiries preferably obtain the information needed to populate the multitier topology map and the results should trigger next inquiries consistent with the organizational structure of the multitier topology map.

The discovery process 910 continues until leaf nodes are reached. In one implementation, the inquiry tree is traversed in a specific order. For example, all inquiries at level 920 might be resolved before moving on to level 930, and so on. Another example is to, traverse each branch down to its leaf nodes before moving on to the next branch. However, because of the somewhat unpredictable (perhaps even unreliable?) nature of most multitier compute infrastructures, it is preferable to traverse the inquiry tree in an asynchronous, parallel manner. Each branch is traversed at its own pace. When one inquiry is answered, the next inquiry is generated until all branches are resolved. In this way, a branch that is slow to resolve (e.g., due to network congestion) does not stall the entire process 910. This is especially advantageous if the results of the discovery process 910 are imported into the multitier topology map as they are generated, rather than all at once upon completion of the process.

Inquiries that are blocked can request human intervention. For example, inquiry 940 might require a user name or password. If the user name or password is not provided a priori, the discovery builder 714A can request it from the user during the discovery process. Alternately, some or all of this information can be provided a priori. FIG. 11 is a screen shot of an access list 981 that compiles this type of information. Window 982 shows additional details. Sensitive information, for example passwords, can be secured using standard security techniques.

Figure 12:
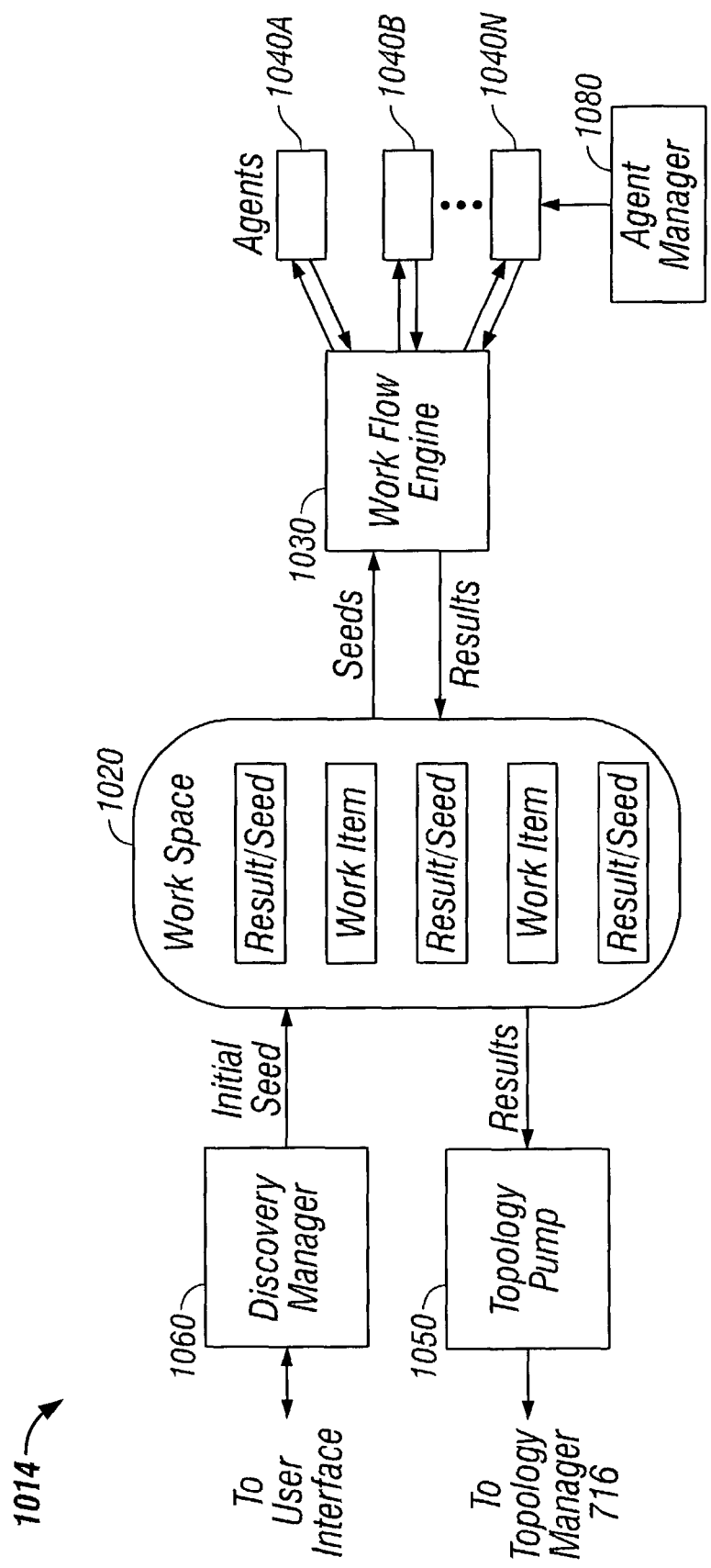
FIG. 12 is a diagram of one implementation of a discovery builder.

FIG. 12 is one implementation 1014 of a discovery builder suitable for implementing the discovery process 810, 910. The discovery builder 1014 includes a workspace 1020 that interacts with the following software modules: workflow engine 1030, topology pump 1050, and discovery manager 1060. The discovery builder 1014 also includes a number of agents 1040A-N and an agent manager 1080. The arrows in FIG. 10 indicate the direction of information flow. In this example, the workspace 1020 is implemented as a Java space and the services are Jini services.

The workspace 1020 is used during the discovery process 910. It typically contains results of inquiries, which may also function as seeds for a next inquiry. It can also contain unresolved work items, such as exceptions or an inquiry awaiting user input of a password. The workspace 1020 provides a snapshot of the current progress of the discovery process 910 and, in some sense, defines the current state of the process.

The workflow engine 1030 and agents 1040 carry out the actual discovery. The agents 1040 implement the inquiries and communicate with the components in the multitier compute infrastructure. Different agents can exist for each tier in the infrastructure—network agents for network components, compute agents for compute components and application agents for application components. The agents 1040 can make use of protocol specific blades to communicate with their respective components. For example, an SNMP blade can be used for network component discovery, while a JMX blade is used for application component discovery. Agents 1040 can also be used to accommodate or take advantage of other tools. For example, if the network tier is already managed using OpenView software, an OpenView agent 1040 can be used to integrate OpenView into the discovery process. Application specific blades can aid in this process. For example, information can be exchanged with HP OV, SMARTS and NetCOOL using these blades. The agents 1040 preferably are non-intrusive in nature.

In one approach, there is a one-to-one correspondence between agents 1040 and inquiries. Referring to FIG. 9, one agent 1040 contains the intelligence to obtain the results for inquiry 920, another obtains results for inquiry 930, a third for inquiry 940, and so on. One advantage of this approach is its modularity. New inquiries can be implemented by adding new agents. Existing inquiries can be updated simply by modifying the corresponding agent.

The agent manager 1080 facilitates the process of adding, deleting and/or modifying agents 1040. It also attends to agent security. In this example, all agents 1040 use secure communications (e.g., using private keys) since they may handle sensitive information and/or may have superuser or similar access to various components. The agent manager 1080 ensures that sensitive data is obtained only by authorized agents and reported results are coming from authorized agents.

The workflow engine 1030 implements the rules concerning which seed triggers which inquiries, and which agent is responsible for that inquiry. For example, the workflow engine knows that result 925A triggers inquiry 930 and also knows which agent 1040 implements inquiry 930. It also manages the overall workflow for the agents 1040 and communicates between the workspace 1020 and the agents 1040.

The discovery manager 1060 and the topology pump 1050 are interfaces to the outside world. The topology pump 1050 is the interface to the topology manager 716. It is responsible for forwarding discovered components and relationships to the topology manager 716 for inclusion in the multitier topology map 720. The discovery manager 1060 is the interface to the user world. It also generally monitors the progress of the discovery process 910, primarily by monitoring the workspace 1020.

Using the process in FIG. 9 as an example, the discovery builder 1014 operates as follows. The discovery manager 1060 initiates the discovery process 910 by placing the initial seed 915 into the workspace 1020. The workflow engine 1030 monitors the workspace 1020. When it sees the initial seed 915, the workflow engine 1030 dispatches the corresponding agent 1040 to answer inquiry 920. The results 925A-N of the inquiry are reported by the agent 1040 to the workflow engine 1030, which places them into the workspace 1020. Some of these results 925 may also be seeds for other inquiries. If so, the workflow engine 1030 recognizes the seeds and dispatches the corresponding agents 1040. The process of looking for seeds in the workspace 1020, dispatching the corresponding agents 1040 and returning the results to the workspace 1020 is repeated until the discovery process 910 is completed. The results/seeds have a time to live so that the workspace 1020 does not become overly cluttered. The agents 1040 generally implement three methods: set seed, get result, and exceptions. The workflow engine 1030 also places pending work items, including exceptions, into the workspace 1020 and retrieves them once resolved.

The topology pump 1050 monitors the workspace 1020 for information that should be forwarded to the topology manager 716 for inclusion in the multitier topology map 720. The discovery manager 1060 monitors the workspace 1020 for its purposes also, for example to refresh the user's view of the discovery process. FIG. 13 is a screen shot of a GUI showing the progress of a discovery process.

Figure 14:
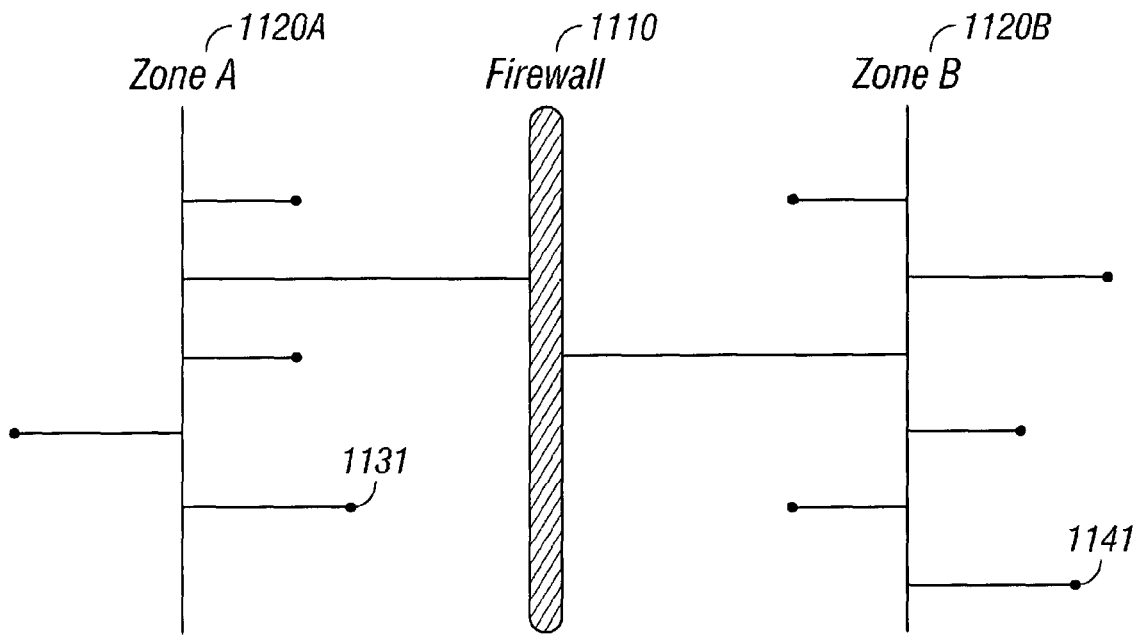
FIG. 14 is a diagram illustrating one method for discovering components across a firewall.

FIG. 14 is a diagram illustrating discovery across firewalls. FIG. 14 depicts a multitier compute infrastructure that is divided into zone A and zone B by a firewall 1110. Each zone is depicted by a vertical line 1120A,B with horizontal lines branching from it. The vertical line 1120 abstractly represents networks within each zone. The horizontal lines represent connections from the networks 1120A,B to devices (represented by the solid circles) or to the firewall 1110. Firewalls 1110 can be problematic during the discovery process 910 because they are intended to limit access to the networks behind the firewall. For example, assume that the discovery builder 1014 is executing on host 1131 in zone A. It can be difficult to obtain information about the components and relationships in zone B due to the firewall.

One alternative is to have two instances of discovery builder 1014, one for each zone. The discovery builder on host 1131 executes the discovery process for zone A. The discovery builder on host 1141 executes the discovery process for zone B. The two results are then combined to produce the overall map for the multitier compute infrastructure.

An alternate approach uses one instance of discovery builder 1014 in conjunction with anchor hosts in the other zones. For example, assume that discovery builder 1014 is executing on host 1131 in zone A and host 1141 is the anchor host for zone B. The two hosts 1131, 1141 communicate with each other through the firewall, for example via SSH or some sort of virtual network. As seeds are received in the workspace of the discovery builder, the base host 1131 determines the relevant agents and whether that specific inquiry is to be conducted in zone B. If it is, the base host 1131 sends the seed and agent to the anchor host 1141. The agent executes on the anchor host 1141, making inquiries with respect to zone B. The results are sent back to the base host 1131, to be placed in the workspace 1020. The process repeats. In this way, the discovery process can be executed for zone B but with minimal software installation and intrusion into zone B. For example, it is not necessary to install the entire discovery builder 1014 on host 1141. Typically, the anchor host 1141 will execute only the portion of the discovery builder 1014 that is required to control execution of the agents sent by the base host 1131. Naturally, more of the discovery builder could be replicated on the anchor host 1141. For example, the workspace 1020 could be duplicated for host 1141 and/or each host 1131, 1141 may have its own library of agents 1040.

Figure 15:
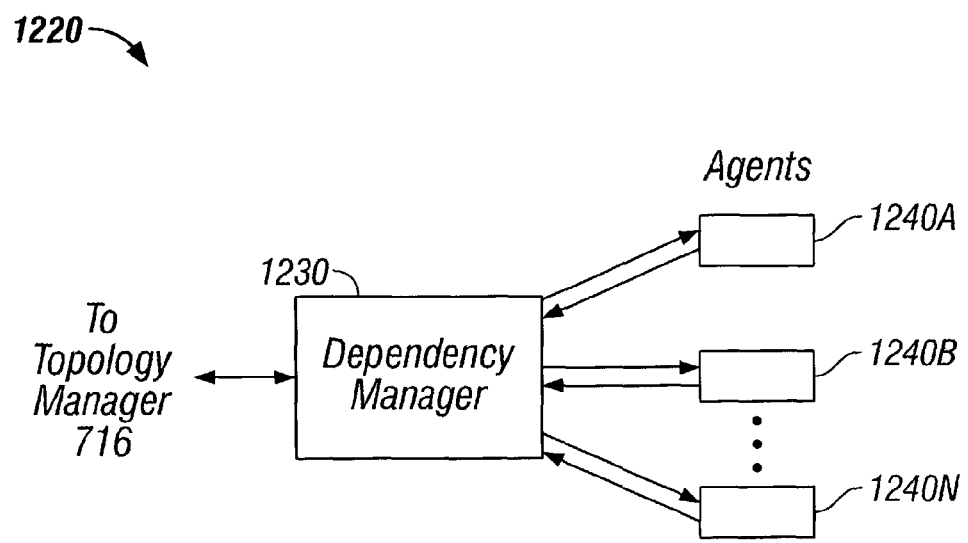
FIG. 15 is a diagram of one implementation of a dependency builder.

FIG. 15 is one implementation 1220 of a dependency builder suitable for implementing dependency discovery 820. In this example, the primary focus of the dependency builder 1220 is to discover relationships which are susceptible to automated discovery but which were not discovered by the discovery builder 1014. The discovery builder 1014 focuses more on producing an inventory of components but discovers certain relationships as a result of the process used to generate the inventory. In some sense, the discovery builder 1014 identifies relationships which are "low-lying fruit" relative to the process of identifying components. The dependency builder 1220 focuses more on relationships themselves and can identify relationships that are more difficult to ascertain. In this example, the relationships uncovered by the discovery builder 1014 tend to be more physical in nature—containment for example.

The relationships uncovered by the dependency builder 2020 are more functional. Here, they tend to be application-level dependencies: transactional dependencies and service dependencies. Examples of service dependencies include determining which DNS server is used by an application component for DNS name resolution, and determining the relevant NFS server for an application component. Examples of transactional dependencies include determining connectivity between an application server and a corresponding database instance, determining runtime dependencies between application components by analyzing TCP connections, determining dependencies between Apache servers and application servers based on the Apache proxy configuration, and determining dependencies between Apache servers and WebLogic servers based on the Apache WebLogic plug in configuration.

The dependency builder 1220 includes a dependency manager 1230 and agents 1240A-N. The agents 1240 do the actual discovery of relationships and communicate with the components in the multitier compute infrastructure. In one approach, each agent 1240 is tasked to discover a certain type of relationship and contains the logic used to resolve details about the relationship. The dependency manager 1230 controls the overall workflow and serves as an interface to the outside world. It communicates with the topology manager 716 in order to maintain the multitier topology map 720. It can also communicate with a user interface, for example to refresh the user's view of the dependency discovery process.

The dependency builder 1220 operates as follows. When dependency discovery is initiated, the dependency manager 1230 calls the agents to perform discovery of individual relationships. In this implementation, the agents are called sequentially in a specific order. This is because the resolution of some relationships depends on the earlier resolution of other relationships. For example, the transactional relationship of a communication port of an ApacheServer to another ApacheServer will not be discovered unless the communication port itself has been previously discovered.

FIGS. 8-15 are merely examples. Other approaches to building a multitier topology map will be apparent. For example, the method in FIG. 8 divides the build process into three phases that are implemented separately. This is not required. The build process can be divided into phases other than the three shown or even implemented in a single process. As another example, the multitier topology map for the entire multitier compute infrastructure is not required to be built at once. It can be divided into parts and the multitier topology map built one piece at a time.

As a final example, the embodiments discussed above assume that there is little or no a priori knowledge about the topology of the multitier compute infrastructure. This is not necessarily the case and alternate embodiments take advantage of a priori knowledge. For example, rather than discovering application-level dependencies using the agents 1240 from dependency builder 1220, application-level dependencies might be documented beforehand. For example, if source code for an application component is available, it can be analyzed for calls to other application components to determine dependencies. Alternately, these dependencies can be documented in a separate file which is used during the build process. As a final example, application-level dependencies (and in fact any or all of the entire build process) can be performed manually.

Once the multitier topology map 720 is populated, it can be sliced and diced in many different ways to show different aspects of the multitier compute infrastructure. Different slices shall be referred to as "views." The following are some examples of views, some of which are shown in FIGS. 16A-16F.

Figures 1, 16A:
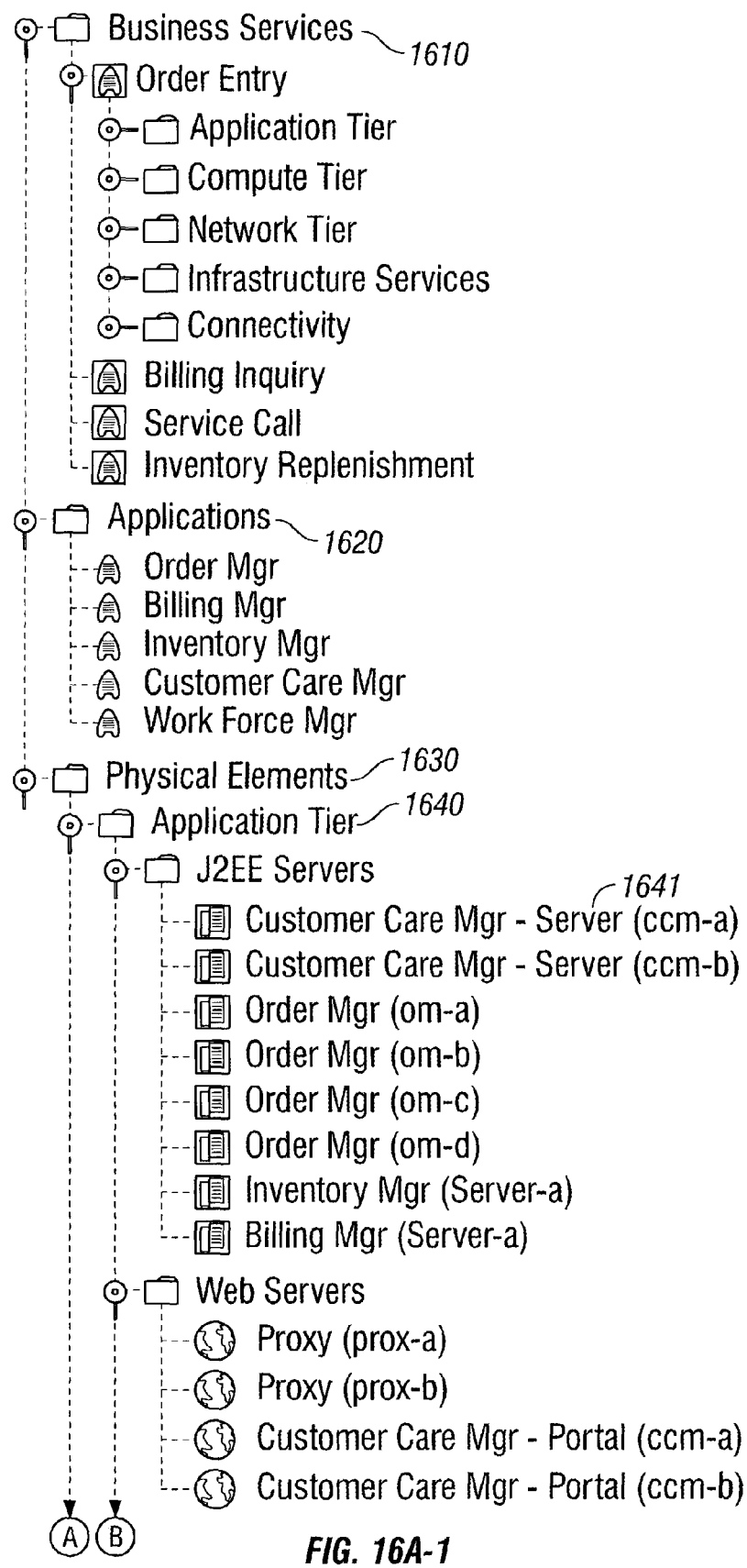
Figures 2, 16A:
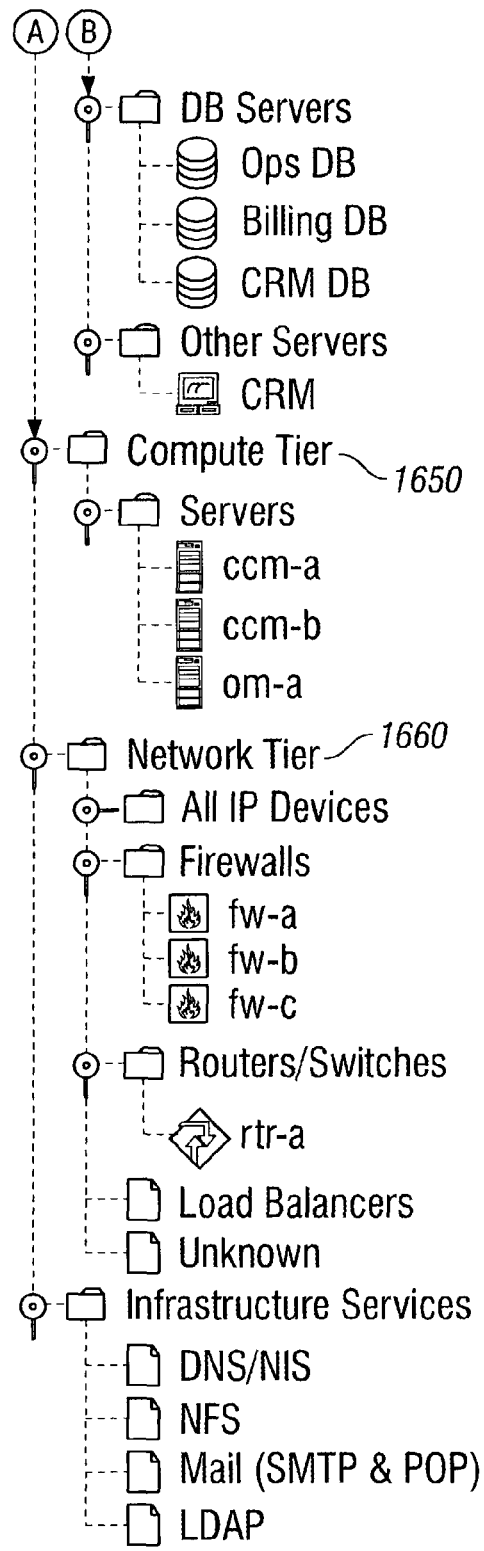

FIG. 16A is a view designed to present an inventory of components in the multitier compute infrastructure. FIG. 16A shows a listing which normally is a single column. However, in order to fit the listing onto a single page, it has been split at points A and B to generate the three-column FIG. 16A. In this example, the components are listed by type. The main categories are business services 1610, applications 1620 and physical elements 1630. Business services 1610 corresponds to business services in FIG. 3 and applications 1620 to applications packages. Physical elements 1630 has three subcategories—application tier 1640, compute tier 1650 and network tier 1660—which correspond to application, compute and network components in FIG. 3. This view is suited for use as a starting point for further inquiry into components.

Selecting one of the components provides further information about that component, for example its static configuration, dependencies on other components or a dynamic view of the component. FIG. 16B is a screen shot showing further details about the Customer Care Mgr-Server web server 1641. The top portion 1642 provides a brief summary of the component. The bottom portion 1643 shows details of the host on which this web server is running. IT directors can use these views to get a quick look at the inventory of components in their multitier compute infrastructure. It is also a way for administrators to quickly obtain information about a specific component without having to traverse a topological tree, for example.

Figure 16C:
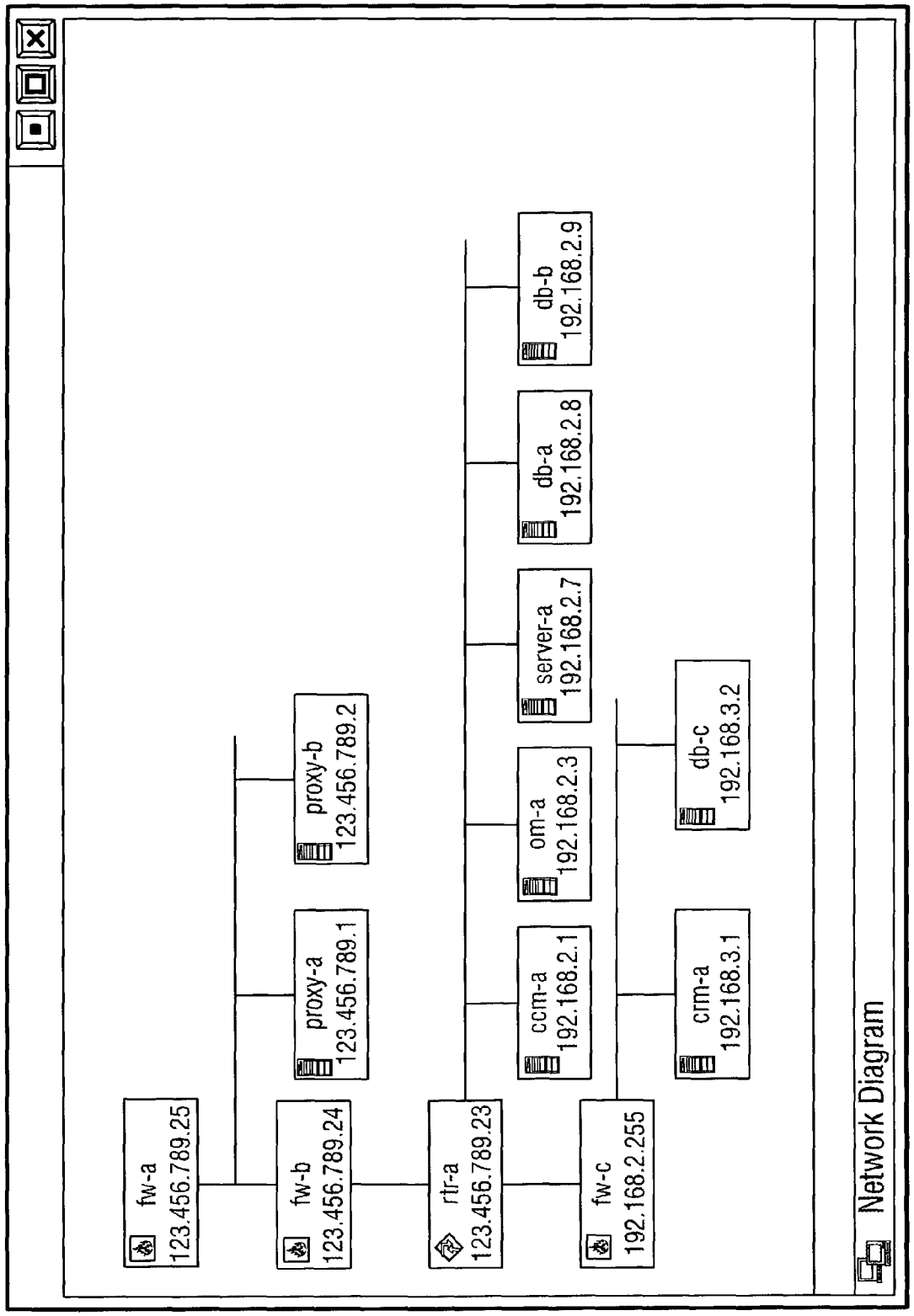

Another view is designed to focus on a specific tier. As one example, FIG. 16C shows a network-centric view with different components and their interconnections. In this example, each box represents a different component and includes the IP address for the component. The devices fw-a, fw-b and fw-c are firewalls separating different parts of the network. Device rtr-a is a router. The lines show network connectivity. This type of view is particularly useful to administrators responsible for a single tier. The network view of FIG. 16C gives the network administrator a good starting point and overview of his tier. The compute and application views are similarly useful for the computer and application administrators. These views can also be used as starting points for further inquiry.

For hardware devices, one example of further information is the static configuration of the device, listing specific parameters and their values. Another example is an inventory of software deployed on the device. For compute servers, this can include the operating system version and patch level, and third party software and their versions. For network devices, this can include the revision level of the software installed on the device. Another example of further information is a dynamic view of the behavior of the device, for example the number of execute threads currently used in an application server.

For application components, a view can be laid out in terms of an application component's packaging as well as in terms of its runtime components. In one implementation, this includes packaging and installation information, for example showing the modules that make up the application component. It can also include runtime components and their dependencies on software services. This shows a logical runtime view in the sense that physical compute resources are disregarded. Alternately, the runtime components can be shown in the context of deployment. This is more of a physical runtime deployment view. It can extend the logical runtime view by mapping runtime components to the corresponding physical compute resources.

Figure 16D:
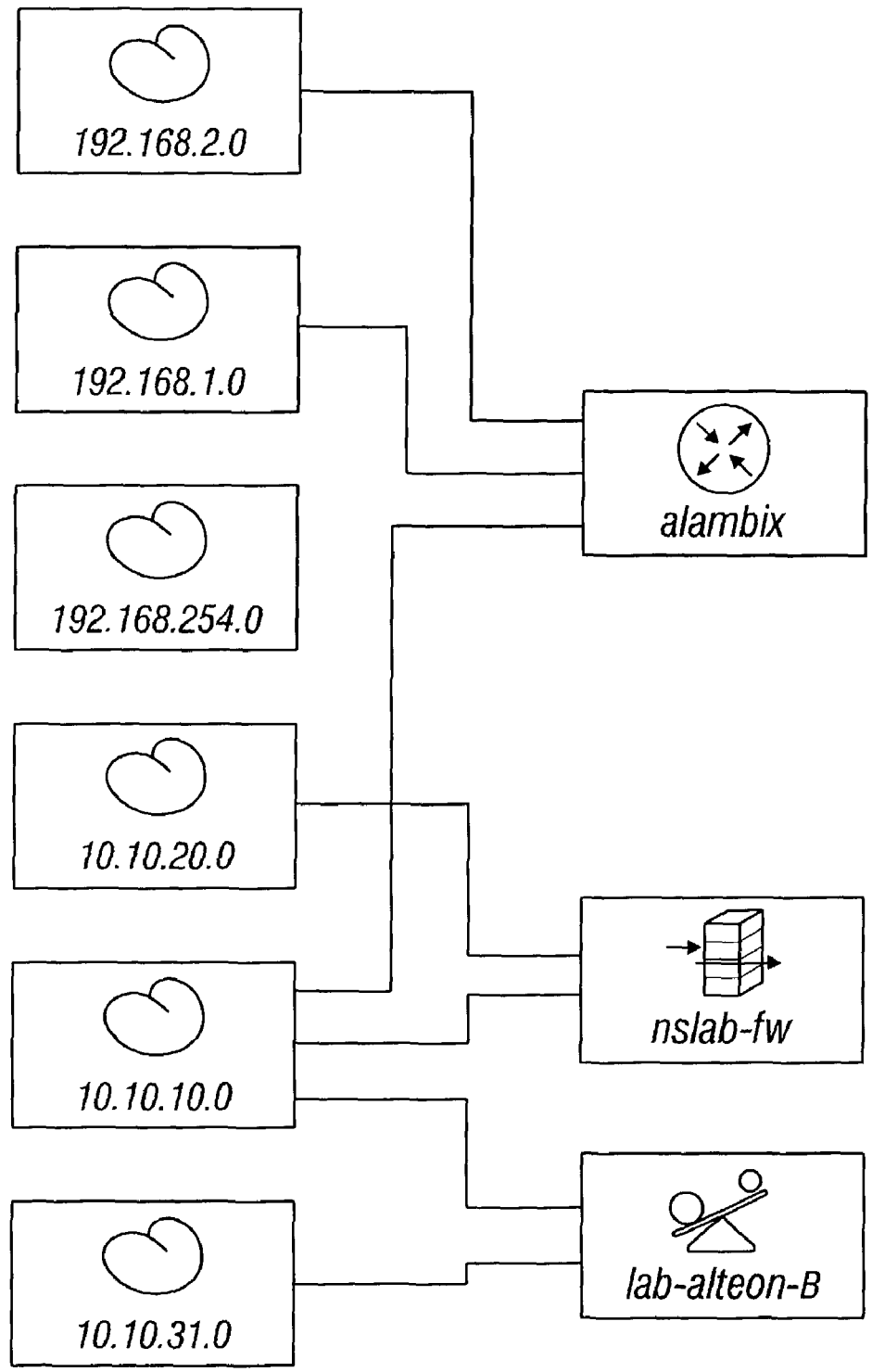

FIG. 16D is a view that shows the physical topology of the multitier compute infrastructure. It includes components from both the network and compute tiers. In this example, "alambix" is a router, "nslab-fw" is a firewall, "lab-alteon-B" is a load balancer, and the remaining boxes represent different subnets, as identified by their IP addresses. The lines show network connectivity. More information about a component can be obtained by selecting that component. For example, selecting the subnet 192.168.2.0 might result in a topological view of that subnet, a list of components in the subnet, or some other description of the subnet.

Figure 16E:
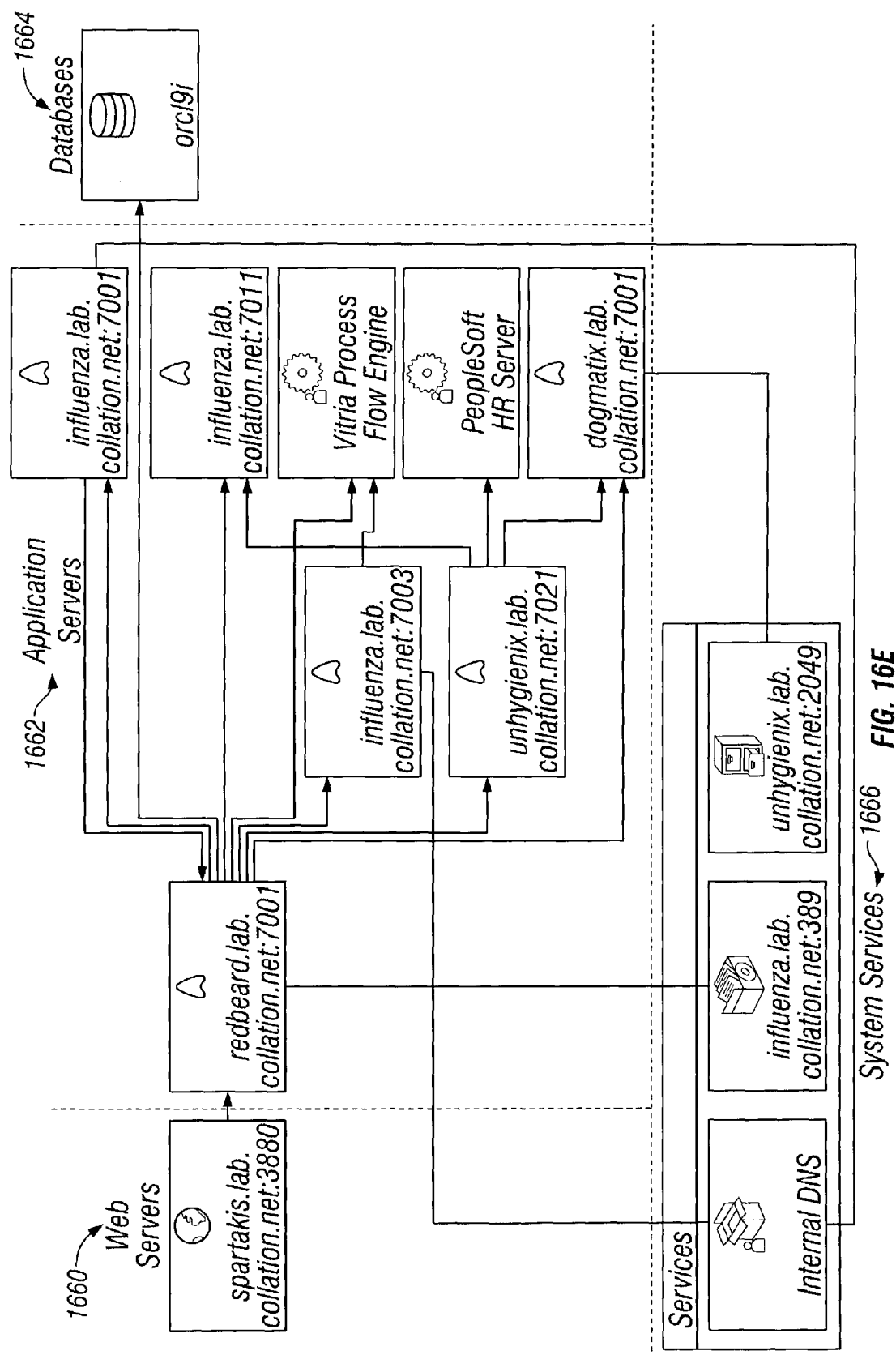

FIG. 16E is a view that shows the topology of the application-level infrastructure. In this example, the application-level infrastructure is subdivided into tiers: the web server tier 1660, the application server tier 1662, the database tier 1664 and system services 1666. In FIG. 16E, there is one web server which is identified by its IP address and port number: spartakis.lab.collation.net:3880. The application server tier 1662 contains multiple instances of application servers. The triangular symbol denotes a specific class of application server that is recognized and/or supported by the system (e.g., WebLogic application servers). These are identified by IP address and port number. The gear symbol denotes a generic class of application servers, which includes "Vitria Process-Flow Engine" and "PeopleSoft HR Server" in this example. The generic class is the default if the application server does not fall into any recognized specific class. Proprietary and legacy application servers typically will fall into this class. The database tier 1664 contains a single database instance. The system services tier 1666 includes DNS (Internal DNS), LDAP (influenza.lab.collation.net:389) and NFS (nhygienix.lab.collation.net:2049).

In this example, the two generic application servers and the DNS servers contain a "person" icon to the lower left of the main icon (gear or box). The person icon indicates that these components were manually added to the multitier topology map. The remaining components were automatically discovered, for example as described above in FIGS. 8-15.

The lines in FIG. 16E show application-level dependencies. The lines to the system service tier 1666 show service dependencies. For example, the application server redbeard.lab.collation.net:7001 has a service dependency on the LDAP server. The remaining lines show transactional dependencies, with the arrows showing the direction of the dependency. The web server spartakis.lab.collation.net:3880 depends on the application server redbeard.lab.collation.net:7001, which depends on many other components. As with the prior examples, more information about a component can be obtained by selecting that component.

Figure 16F:
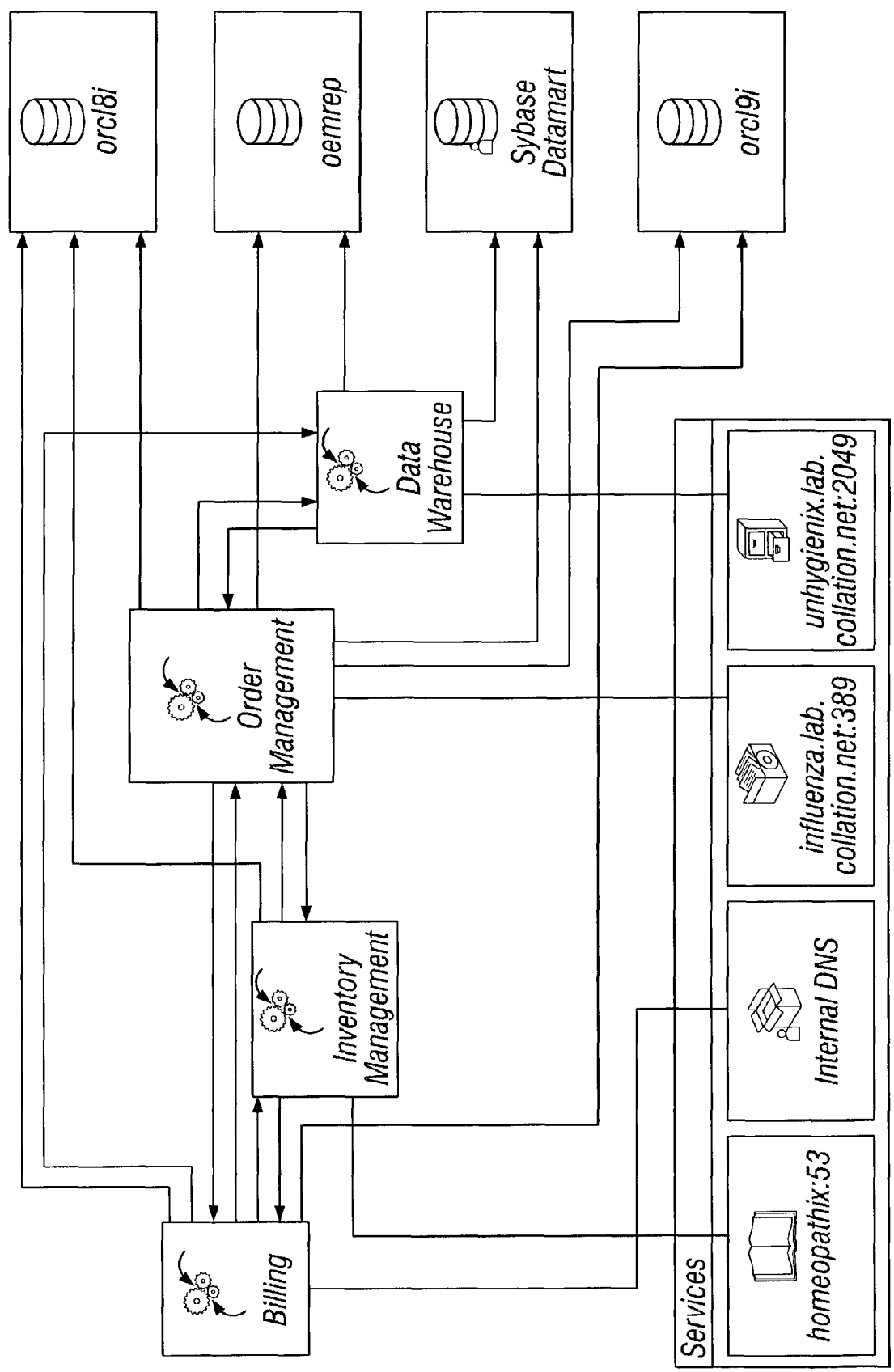

FIG. 16F is a view that gives visibility into business application packages and/or business services. In this example, the "three-gear" boxes represent the business application packages Billing, Inventory Management, Order Management and Data Warehouse. This view also includes the databases orcl8i, oemrep, Sybase DataMart and orcl9i. System services include DNS server homeopathix:53 in addition to the system services shown in FIG. 16E. The person icon indicates that Sybase DataMart and Internal DNS were manually added to the multitier topology map. As in FIG. 16E, the lines show both service dependencies and transactional dependencies.

FIG. 16F is a more business centric view than FIG. 16E. FIG. 16E shows the logical relationship between different components but does not clearly show what business functions are implemented by which components. In contrast, FIG. 16F shows the logical relationships between business functions. This provides a high level view showing how a business service or business application package is implemented by the multitier compute infrastructure. FIG. 16E typically would be more useful to the applications system administrator but FIG. 16F would be more useful to the executive management. Each of the application-level components shown can be queried for more information, for example dependencies on other components or underlying compute and network components.

Although the invention has been described in considerable detail with reference to certain preferred embodiments thereof, other embodiments will be apparent. For example, functionality is generally independent of its implementation. Functions described as implemented in software typically can also be implemented in hardware, firmware, etc., and vice versa. Therefore, the scope of the appended claims should not be limited to the description of the preferred embodiments contained herein.

What is claimed is:

1. A computer-implemented method implemented in modules of a computer apparatus for discovering a topology of a multitier compute infrastructure, the method comprising:
    discovering components in the multitier compute infrastructure, including components in an application tier, compute tier, and network tier;
    discovering physical relationships between components in the multitier compute infrastructure, including components in the application, compute, and network tiers and a containment of applications on hardware components;
    generating an inventory of discovered components and the physical relationships, including a business services component table indicating business services, an application component table, and a network component table, wherein a business service defines relationship between components in the multitier compute infrastructure and business functions; and
    deducing non-physical relationships between components in the inventory, based at least in part on information obtained in the operations of discovering components and discovering physical relationships, wherein the deduced non-physical relationships comprise at least one of transactional dependencies indicating connectivity between applications and service dependencies indicating services an application uses, and wherein the deduced non-physical relationships include at least a first relationship table identifying a containment relationship of the network components indicated in the network component table containing application components indicated in the application component table, and a second relationship table identifying business services and the application components indicated in the application component table that perform the business service functions;
    generating the topology map of the multitier compute infrastructure to include information from the generated inventory and the deduced non-physical relationships.

2. The computer-implemented method of claim 1 wherein:
    the multitier compute infrastructure includes network components, compute components and application components; and
    the generating the inventory comprises generating the inventory including network components, compute components and application components.

3. The computer-implemented method of claim 2 wherein the discovering of the components in the multitier compute infrastructure comprises:
    discovering application components in the multitier compute infrastructure; and
    discovering version and configuration information for at least some of the discovered application components.

4. The computer-implemented method of claim 2 wherein the deducing non-physical relationships comprises:
    deducing application-level relationships between components in the inventory.

5. The computer-implemented method of claim 1 wherein the discovering components is guided by input from a user.

6. The computer-implemented method of claim 1 wherein the discovering components comprises:
    obtaining results for a series of inquiries, the inquiries triggered by results obtained for previous inquiries.

7. The computer-implemented method of claim 6 wherein the results are obtained for inquiries in an asynchronous, parallel manner.

8. The computer-implemented method of claim 7 wherein the obtaining results for a series of inquiries comprises:
requesting user intervention if an inquiry is blocked.

9. The computer-implemented method of claim 7 wherein:
the discovering components further comprises receiving intervention information before beginning the step of obtaining results for a series of inquiries; and
using the intervention information to avoid blocking of inquiries.

10. The computer-implemented method of claim 9 wherein the intervention information includes passwords for access to components.

11. The computer-implemented method of claim 1 further comprising:
building a multitier topology map based at least in part on the inventory of discovered components, the discovered physical relationships and the deduced non-physical relationships.

12. The computer-implemented method of claim 11 wherein:
the discovering components comprises obtaining results for a series of inquiries;
the series of inquiries is selected to match a structure of the multitier topology map; and
the building the multitier topology map comprises populating the multitier topology map with results for the inquiries.

13. The computer-implemented method of claim 11 wherein:
the multitier compute infrastructure includes at least two parts;
the discovering components, discovering physical relationships between components, generating an inventory of discovered components and deducing non-physical relationships between components are performed separately for each part; and
the building the multitier topology map is based at least in part on the inventory of discovered components, the discovered physical relationships and the deduced non-physical relationships for the parts.

14. The computer-implemented method of claim 1 further comprising:
receiving user-defined components based on the components in the inventory and/or receiving user-defined relationships between components.

15. The computer-implemented method of claim 14 wherein the user-defined components include business application packages and/or business services.

16. The computer-implemented method of claim 1 wherein the discovering components, discovering physical relationships between components and generating an inventory of discovered components occurs separately in time from the deducing non-physical relationships between components.

17. The computer implemented method of claim 1, further comprising:
receiving user input manually defining higher-level components and relationships comprising business application packages and business services, wherein the generated topology indicates the user defined higher-level components.

18. An interface module implemented in a computer apparatus having a processor, wherein the processor executes the interface module to discover a topology of a multitier compute infrastructure, the interface module comprising:
a discovery builder for discovering components in the multitier compute infrastructure, for discovering physical relationships between components in the multitier compute infrastructure, including components in an application, compute, and network tiers and a containment of applications on hardware components, and for generating an inventory of discovered components and the physical relationships, including a business services component table, and a network component table, wherein a business service defines relationship between components in the multitier compute infrastructure and business functions;
a dependency builder for deducing non-physical relationships between discovered components, based at least in part on information discovered by the discovery builder, wherein the deduced non-physical relationships comprise at least one of transactional dependencies indicating connectivity between applications and service dependencies indicating services an application uses, and wherein the deduced non-physical relationships include at least a first relationship table identifying a containment relationship of the network components indicated in the network component table containing application components indicated in the application component table, and a second relationship table identifying business services and the application components indicated in the application component table that perform the business service functions; and
a topology manager for building a multitier topology map of the multitier compute infrastructure based at least in part on information discovered by the discovery builder on the dependency builder.

19. The interface module of claim 18 wherein the dependency builder is further for deducing application-level relationships between components.

20. The interface module of claim 18 further comprising:
an update module for performing incremental updates to the multitier topology map.

21. The interface module of claim 18 wherein the interface module is based on 100% Java.

22. The interface module of claim 18 wherein the interface module is implemented as a distributed software application.

23. The interface module of claim 18 further comprising:
a scope manager for defining a boundary of the multitier compute infrastructure.

24. The interface module of claim 18 wherein:
the multitier compute infrastructure implements a J2EE software component architecture having entity Java beans (EJBs); and
the components of the multitier compute infrastructure include EJBs from the J2EE software component architecture.

25. The interface module of claim 18, further comprising:
a user interface for receiving user input manually defining higher-level components and relationships comprising business application packages and business services, wherein the generated topology indicates the user defined higher-level components.

26. A dependency builder implemented in a computer apparatus having a processor, wherein the processor executes the dependency builder for deducing non-physical relationships between components in an inventory for a multitier compute infrastructure, the dependency builder comprising:
a plurality of agents, each agents for deducing a specific non-physical relationship, wherein the deduced non-physical relationships comprise at least one of transactional dependencies indicating connectivity between applications and service dependencies indicating services an application uses, wherein the deduced non-physical relationships are determined from an inventory of discovered components in the multitier compute infrastructure and discovered physical relationships between the components in the multitier compute infrastructure, including components in an application tier, compute tier, and network tier, wherein the inventory includes a business services component table indicating business services, an application component table, and a network component table, wherein a business service defines relationship between components in the multitier compute infrastructure and business functions, and wherein the deduced non-physical relationships include at least a first relationship table identifying a containment relationship of the network components indicated in the network component table containing application components indicated in the application component table, and a second relationship table identifying business services and the application components indicated in the application component table that perform the business service functions; and a dependency manager for dispatching the agents and communicate with a topology manager to maintain a multitier topology map.

27. The dependency builder of claim 26 wherein the dependency manager dispatches the agents in a predetermined order.

* * * * *